United States Patent
Wang

(10) Patent No.: US 12,395,669 B2
(45) Date of Patent: Aug. 19, 2025

(54) CODING A PIXEL STRING VECTOR BASED ON ATTRIBUTE INFORMATION OF THE PIXEL STRING

(71) Applicant: Tencent Technology (Shenzhen) Company Limited, Guangdong (CN)

(72) Inventor: Yingbin Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 355 days.

(21) Appl. No.: 17/986,788

(22) Filed: Nov. 14, 2022

(65) Prior Publication Data

US 2023/0080180 A1 Mar. 16, 2023

Related U.S. Application Data

(63) Continuation of application No. PCT/CN2021/122655, filed on Oct. 8, 2021.

(30) Foreign Application Priority Data

Dec. 4, 2020 (CN) .......................... 202011416477.X

(51) Int. Cl.
*H04N 19/513* (2014.01)
*H04N 19/129* (2014.01)
*H04N 19/182* (2014.01)

(52) U.S. Cl.
CPC ......... *H04N 19/513* (2014.11); *H04N 19/129* (2014.11); *H04N 19/182* (2014.11)

(58) Field of Classification Search
CPC .................................................. H04N 19/513
See application file for complete search history.

(56) References Cited

U.S. PATENT DOCUMENTS

| 2017/0150168 | A1 | 5/2017 | Nakamura et al. |
| 2017/0295376 | A1* | 10/2017 | Lee ...................... H04N 19/513 |
| 2019/0110079 | A1* | 4/2019 | Lin ...................... H04N 19/176 |

FOREIGN PATENT DOCUMENTS

| CN | 105549817 A | 5/2016 |
| CN | 107071450 A | 8/2017 |
| CN | 107483941 A | 12/2017 |
| CN | 111050182 A | 4/2020 |
| CN | 111163322 A | 5/2020 |

OTHER PUBLICATIONS

International Search Report and Written Opinion in PCT/CN2021/122655, mailed Jan. 12, 2022, 13 pages.
Wang et al., "AHG8: String match in coding of screen content," Joint Collaborative Team on Video Coding (JCT-VC) of ITU-T SG16 WP3 and ISO/IEC JTC1/SC29/WG11, 17th Meeting: Valencia, ES, Mar. 27-Apr. 4, 2014, Document: JCTVC-Q0176, 14 pages.
Office Action received for Chinese Patent Application No. 202011416477.X, mailed on May 25, 2024, 40 pages (21 pages of English Translation and 19 pages of Original Document).

\* cited by examiner

*Primary Examiner* — Jerry T Jean Baptiste
(74) *Attorney, Agent, or Firm* — ArentFox Schiff LLP

(57) ABSTRACT

A method for encoding a string vector includes obtaining attribute information of a pixel string in an image frame, the attribute information comprising at least one of position information of the pixel string within the image frame or a length of the pixel string. The method further includes encoding information indicating a first string vector of the pixel string based on the attribute information of the pixel string to obtain a bitstream.

18 Claims, 17 Drawing Sheets

CODING A PIXEL STRING VECTOR BASED ON ATTRIBUTE INFORMATION OF THE PIXEL STRING

RELATED APPLICATIONS

This application is a continuation of International Application No. PCT/CN2021/122655, entitled "STRING VECTOR ENCODING AND DECODING METHOD, AND ENCODING DEVICE, DECODING DEVICE AND STORAGE MEDIUM," filed on Oct. 8, 2021, which claims priority to Chinese Patent Application No. 202011416477.X, entitled "METHOD FOR ENCODING AND DECODING STRING VECTOR, ENCODING DEVICE, DECODING DEVICE AND STORAGE MEDIUM," filed on Dec. 4, 2020. The entire disclosures of the prior applications are hereby incorporated by reference.

FIELD OF THE TECHNOLOGY

Embodiments of this application relate to the field of image processing technologies, including a method for encoding and decoding a string vector, an encoding device, a decoding device and a storage medium.

BACKGROUND OF THE DISCLOSURE

Currently, mainstream video encoding standards, such as high efficiency video coding (HEVC), versatile video coding (VVC), and audio video coding standard (AVS) 3, all adopt a hybrid encoding framework based on image blocks. These standards divide an original one-frame image into a series of image blocks, combined with video encoding methods such as prediction, transformation and entropy encoding, to achieve the compression of video data. Motion compensation is a type of prediction method commonly used in video coding and decoding. The motion compensation determines a predicted value of a current to-be-encoded image block according to a reference block based on redundancy characteristics of video content in a time domain or an airspace. Such prediction methods based on the motion compensation include: an inter prediction, an intra block copy, an intra string copy, and the like. For image blocks using these prediction methods, it is generally necessary to encode one or more two-dimensional displacement vectors explicitly or implicitly in a bitstream, to indicate the displacement of the current to-be-encoded image block relative to one or more of its reference blocks.

SUMMARY

In an embodiment, a method for encoding a string vector includes obtaining attribute information of a pixel string in an image frame, the attribute information comprising at least one of position information of the pixel string within the image frame or a length of the pixel string. The method further includes encoding information indicating a first string vector of the pixel string based on the attribute information of the pixel string to obtain a bitstream.

In an embodiment, a method for decoding a string vector includes obtaining a bitstream and attribute information of a pixel string, the attribute information comprising at least one of position information of the pixel string within an image frame or a length of the pixel string. The method further includes parsing the bitstream based on the attribute information of the pixel string to obtain a first string vector of the pixel string.

In an embodiment, an apparatus for encoding a string vector includes processing circuitry configured to obtain attribute information of a pixel string in an image frame, the attribute information comprising at least one of position information of the pixel string within the image frame or a length of the pixel string. The processing circuitry is further configured to encode information indicating a first string vector of the pixel string based on the attribute information of the pixel string to obtain a bitstream.

BRIEF DESCRIPTION OF THE DRAWINGS

To describe technical solutions in embodiments of the present disclosure more clearly, the following briefly describes the accompanying drawings required for describing the embodiments.

DESCRIPTION OF EMBODIMENTS

The technical solutions in embodiments of the present disclosure are described below with reference to the accompanying drawings in the embodiments of the present disclosure.

In order to reduce bits required for a displacement vector, the related art further adopts various methods to achieve this purpose. For example: In an intra string copy, an encoding device encodes an identifier to identify whether a string vector (SV) of a to-be-encoded pixel string is (0, −1). If the SV is not (0, −1), the encoding device continues to encode an identifier, which is used to indicate whether the SV is in a historical list. If yes, the encoding device encodes an index of the SV in the historical list. If the SV is not in the historical list, the encoding device needs to encode the SV, that is, encode horizontal and longitudinal (vertical) coordinates of the SV. That the encoding device encodes the identifier, the index, and the like may be understood as implicit encoding of the SV, and the encoding of the horizontal and longitudinal coordinates of the SV may be understood as explicit encoding of the SV.

In conclusion, in the intra string copy, neither the explicit nor implicit encoding of the SV performed by the encoding device distinguishes between long and short strings, so this method may lead to a problem that an encoding effect of the short string is better and an encoding effect of the long string is poor.

Before introducing the technical solution of this disclosure, image or video encoding and decoding frameworks, an intra string copy technology, a SV prediction in AVS3, a derivation of a string vector predictor (SVP), and encoding and decoding processes of SV in AVS3 are first described as follows:

I: Image or video encoding and decoding frameworks, that is, hybrid encoding framework.

Figure 1:
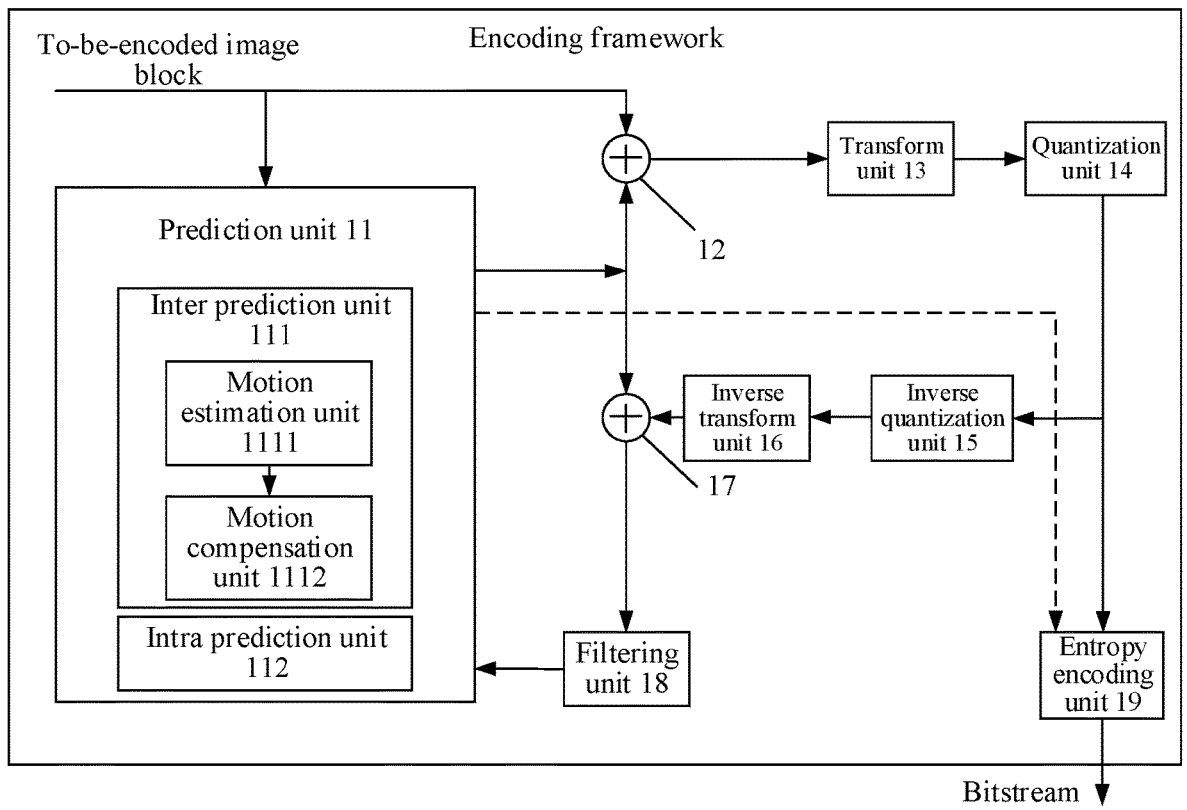
FIG. 1 is a schematic diagram of an encoding framework according to an embodiment of this disclosure.

In some embodiments, FIG. 1 is a schematic diagram of an encoding framework according to an embodiment of this disclosure. As shown in FIG. 1, the encoding framework includes: a prediction unit 11, a residual generation unit 12, a transform unit 13, a quantization unit 14, an inverse quantization unit 15, an inverse transform unit 16, a reconstruction unit 17, a filtering unit 18, and an entropy encoding unit 19. The prediction unit 11 includes an inter prediction unit 111 and an intra prediction unit 112. The inter prediction unit 111 includes a motion estimation unit 1111 and a motion compensation unit 1112.

After receiving a video, the encoding device divides each frame of image that constitutes the video into a plurality of to-be-encoded image blocks. For a current to-be-encoded image block, the prediction unit 11 first predicts the current to-be-encoded image block by referring to a reconstructed image block, to obtain predicted information of the current to-be-encoded image block. The encoding device may obtain the predicted information using an inter prediction or intra prediction technology.

For example, the motion estimation unit 1111 in the inter prediction unit 111 may search for a reference picture in a list of reference pictures to find a reference block of the to-be-encoded image block. The motion estimation unit 1111 may generate an index indicating the reference block, and a motion vector indicating a spatial displacement between the to-be-encoded image block and the reference block. The motion estimation unit 1111 may output the index of the reference block and the motion vector as motion information of the to-be-encoded image block. The motion compensation unit 1112 may obtain the predicted information of the to-be-encoded image block based on the motion information of the to-be-encoded image block.

The intra prediction unit 112 may generate the predicted information for the current to-be-encoded image block using an intra prediction mode. There are currently 15 intra prediction modes, including a Planar mode, a DC mode, and 13 angle prediction modes. The intra prediction unit 112 may also employ an intra block copy (IBC) technology, an intra string copy (ISC) technology, and the like.

The residual generation unit 12 is used to subtract the predicted information from an original signal of the current to-be-encoded image block to obtain a residual signal. After prediction, an amplitude of the residual signal is much smaller than that of the original signal. The transform unit 13 and the quantization unit 14 are used to transform and quantify the residual signal. After transformation and quantification, a transformation quantification coefficient is obtained. The entropy encoding unit 19 is used to encode the quantification coefficient and other indicative information in the encoding by an entropy encoding technology to obtain a bitstream.

Further, the encoding device further needs to reconstruct the current to-be-encoded image block to provide reference pixels for the encoding of a subsequent to-be-encoded image block. For example, after obtaining the transformation quantification coefficient of the current to-be-encoded image block, the inverse quantization unit 15 and the inverse transform unit 16 perform inverse quantization and inverse transformation on the transformation quantization coefficient of the current to-be-encoded image block, to obtain a reconstructed residual signal. The reconstruction unit 17 adds the reconstructed residual signal and the predicted information corresponding to the current to-be-encoded image block, to obtain a reconstruction signal of the current to-be-encoded image block, and obtains the reconstructed image block according to the reconstruction signal. Still further, the filtering unit 18 may filter the reconstructed image block, where deblocking effect filter, sample adaptive offset (SAO), or adaptive loop filter (ALF), and the like may be used. The reconstructed image block may predict the subsequent to-be-encoded image block.

Figure 2:
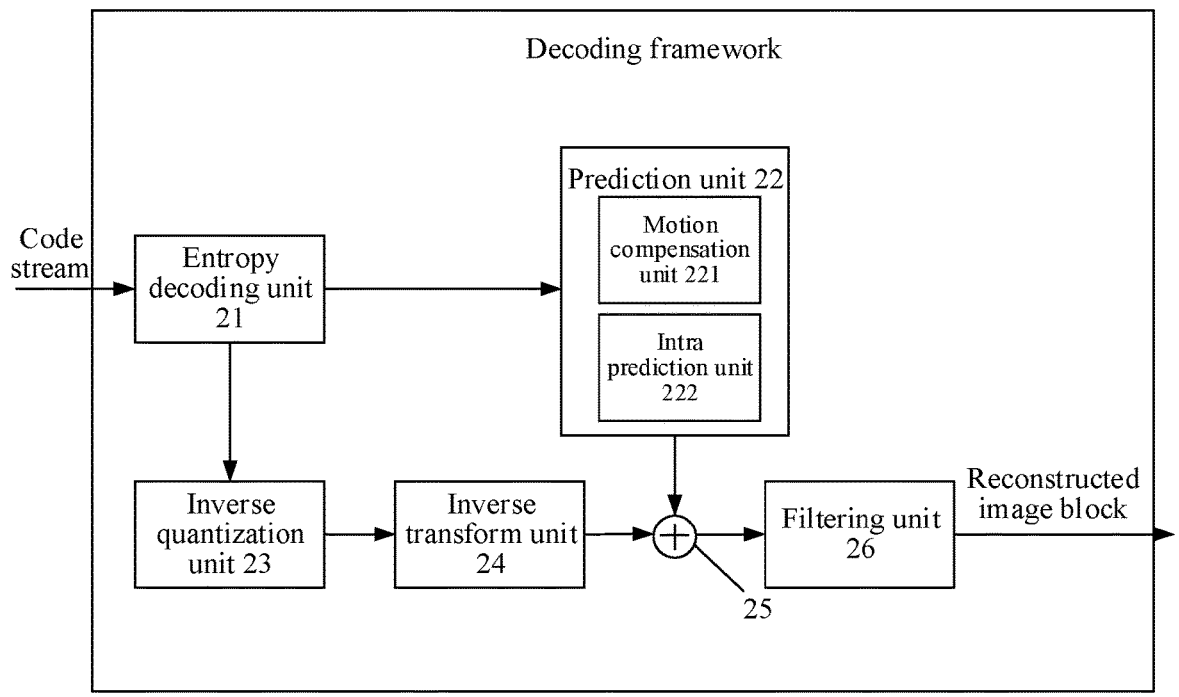
FIG. 2 is a schematic diagram of a decoding framework according to an embodiment of this disclosure.

In some embodiments, FIG. 2 is a schematic diagram of a decoding framework according to an embodiment of this disclosure. As shown in FIG. 2, the decoding framework includes: an entropy decoding unit 21, a prediction unit 22, an inverse quantization unit 23, an inverse transform unit 24, a reconstruction unit 25, and a filtering unit 26. The prediction unit 22 includes: a motion compensation unit 221 and an intra prediction unit 222.

For example, after a decoding device obtains a bitstream, the entropy decoding unit 21 first performs entropy decoding on the bitstream to obtain a transformation quantification coefficient of a current to-be-reconstructed image block. Then, the inverse quantization unit 23 and the inverse transform unit 24 perform inverse quantization and inverse transformation on the transformation quantification coefficient to obtain a reconstructed residual signal of the current to-be-reconstructed image block. The prediction unit 22 predicts the current to-be-reconstructed image block, and obtains predicted information of the current to-be-reconstructed image block. If the prediction unit 22 adopts an inter prediction, the motion compensation unit 221 may construct a first reference picture list (list 0) and a second reference picture list (list 1) according to grammatical elements parsed from the bitstream. In addition, the entropy decoding unit 21 may parse motion information of a to-be-reconstructed image block. The motion compensation unit 221 may determine one or more reference blocks of the to-be-reconstructed image block according to the motion information. The motion compensation unit 221 may generate the predicted information of the to-be-reconstructed image block according to the one or more reference blocks. If the prediction unit 22 adopts an intra prediction, the entropy decoding unit 21 may parse an index of an intra prediction mode used, and the intra prediction unit 222 may, according to the index, use the intra prediction mode to perform the intra prediction to obtain the predicted information of the to-be-reconstructed image block. The intra prediction unit 222 may also adopt the IBC or ISC technology and the like.

Further, the reconstruction unit 25 is used to add the predicted information and the reconstructed residual signal, to obtain a reconstruction signal of the current to-be-reconstructed image block, and then obtain a current reconstructed image block corresponding to the current to-be-reconstructed image block according to the reconstruction signal, where the current reconstructed image block may predict subsequent other to-be-reconstructed image blocks. Similar to a case of the above encoding device, in some embodiments, in the decoding device, the filtering unit 26 may filter the current reconstructed image block.

II. ISC Technology

Figure 3:
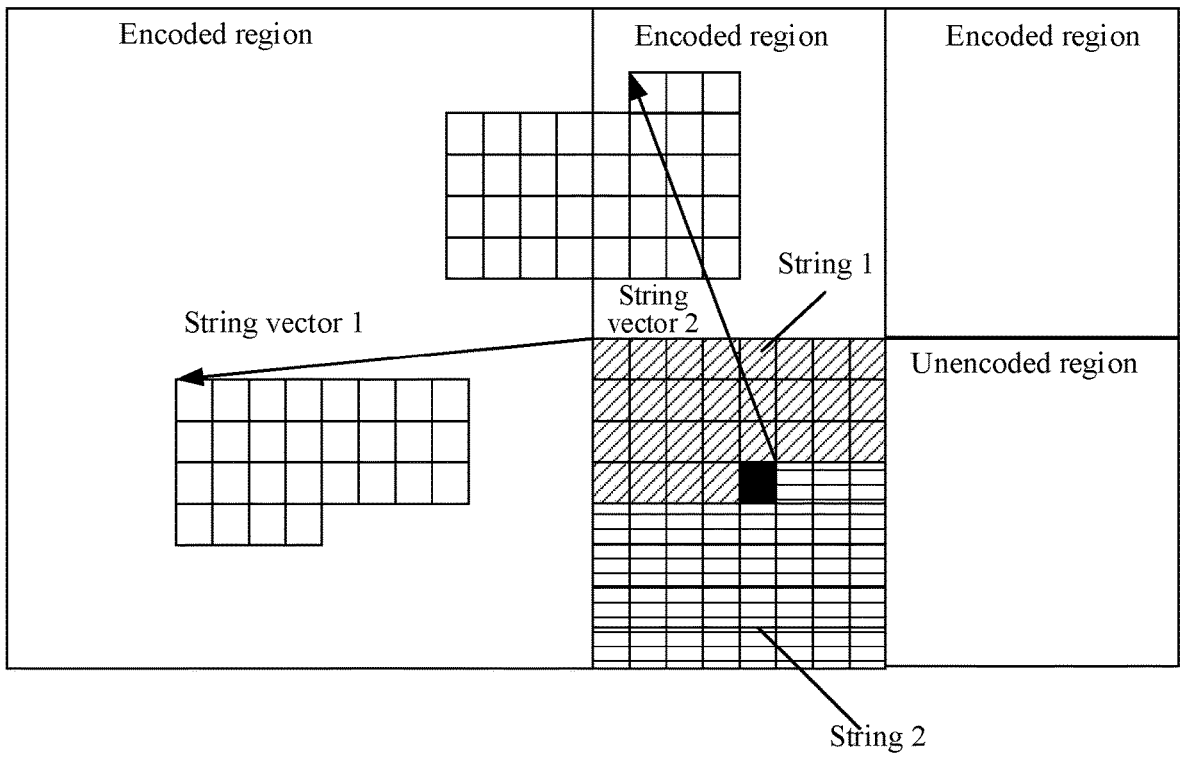
FIG. 3 is a schematic diagram of an intra string copy according to an embodiment of this disclosure.

The ISC divides a to-be-encoded image block into a series of pixel strings or unmatched pixels in a certain scanning order (raster scan, reciprocal scan, Zig-Zag scan, or the like). Similar to the IBC, a current string finds a reference string of the same shape in an encoded region of a current frame of image. Based on this, predicted information of the current string is derived, a residual signal of the current string is obtained by encoding an original signal and the predicted information of the current string, and the residual signal is encoded. For example: FIG. 3 is a schematic diagram of an intra string copy according to an embodiment of this disclosure. As shown in FIG. 3, 28 pixels of diagonal stripes are string 1, 35 pixels of horizontal stripes are string 2, and 1 pixel in black represents an unmatched pixel. A reference string of string 1 is on a left side thereof, and a displacement of string 1 to the corresponding reference string is represented by string vector 1. A reference string of string 2 is above string 2, and a displacement of string 2 to the corresponding reference string is represented by string vector 2.

The ISC technology needs to encode a SV corresponding to each string, a length of the string, and a flag of whether there is a reference string in the current to-be-encoded image block.

In this disclosure, the current to-be-encoded image block is also referred to as an encoding unit, a current to-be-encoded unit, a to-be-encoded unit, a to-be-encoded image block, or the like, which is not limited in this disclosure.

III. SV Prediction in AVS3

The IBC and ISC are intra encoding tools adopted in HEVC screen content coding (SCC) extension, which significantly improves an encoding efficiency of screen content. The IBC and ISC both use a current frame of image as a reference to derive predicted information of a current block or a current string by motion compensation. Taking into account that the IBC and ISC have a similar reference region, and a block vector (BV) and the SV have a high correlation, the encoding efficiency may be further improved by allowing a prediction between the two. The AVS3 uses an intra history-based motion vector prediction (IntraHMVP) similar to HMVP to record displacement vector information, position information, size information, and number of repetitions of this two types of encoded blocks (that is, a current block in the IBC and a current string in the ISC), and derives a block vector predictor (BVP) and the SVP by the IntraHMVP.

IV. Derivation of SVP

In the AVS3, the encoding device encodes an index, which is an index of the SVP of the SV in the IntraHMVP. Similar to a skip mode in the inter prediction, a SV of the current string is equal to a SVP, so in this case, there is no need to encode a residual between the SV and SVP.

V. Encoding Process of SV in AVS3

In the intra string copy, the encoding device encodes an identifier to identify whether a SV of a to-be-encoded string is (0, −1). If the SV is not (0, −1), the encoding device continues to encode an identifier, which is used to indicate whether the SV is in a historical list. If yes, the encoding device encodes an index of the SV in the historical list. If the SV is not in the historical list, the encoding device needs to encode the SV, that is, encode horizontal and longitudinal coordinates of the SV. For example, a horizontal coordinate svX[i] and a longitudinal coordinate svY[i] of a string vector SV[i] of an i-th part of a current encoding unit may be calculated by a method to perform encoding, where the horizontal coordinate svX[i] of the SV[i] is also referred to as a horizontal component of the SV[i], and the longitudinal coordinate svY[i] of the SV[i] is referred to as a vertical component of the SV[i]:

```
svX[i] = SvXNonZeroFlag[i] ? (SvXSign[i] ? −(SvXAbsMinus1 + 1):
SvXAbsMinus1 + 1) : 0
svY[i] = SvYNonZeroFlag[i] ? (SvYSign[i] ? −(SvYAbsMinus1 + 1):
SvYAbsMinus1 + 1) : 0
if(svY[i] <= −1 && svX[i] == 0)
{
  svY[i] = svY[i] − 1
}
```

Where, SvXNonZeroFlag[i] is equal to a value of sv_x_non_zero_flag [i]. The value of sv_x_non_zero_flag [i] is '0', indicating that a value of svX[i] is not equal to 0, and the value of sv_x_non_zero_flag [i] is '1', indicating that the value of svX[i] is equal to 0. If sv_x_non_zero_flag [i] is not present in a bit stream, a value of SvXNonZeroFlag [i] is 1.

SvXSign[i] equals a binary variable of a value of sv_x_sign [i]. sv_x_sign [i] is used to determine the positivity and negativity of svX[i] of the current encoding unit. A value of sv_x_sign [i] is '0', indicating that svX[i] is positive; the value is '1', indicating that svX[i] is negative. If sv_x_sign [i] is not present in the bit stream, a value of SvXSign[i] is 1.

SvXAbsMinus1[i] equals a value of sv_x_abs_minus1[i]. sv_x_abs_minus1[i] is an absolute value of svX[i] minus 1. If sv_x_abs_minus1[i] is not present in the bit stream, a value of SvXAbsMinus1[i] is 1.

SvYNonZeroFlag[i] is equal to a value of sv_y_non_zero_flag [i]. The value of sv_y_non_zero_flag [i] is '0', indicating that a value of svY[i] of the current encoding unit is not equal to 0; the value of sv_y_non_zero_flag [i] is '1', indicating that the value of svY[i] is equal to 0. If sv_y_non_zero_flag [i] is not present in the bit stream, a value of SvYNonZeroFlag[i] is 1.

SvYSign[i] is equal to a value of sv_y_sign [i], and the value of sv_y_sign [i] is used to determine the positivity and negativity of svX[i] of the current encoding unit. The value of sv_y_sign [i] is '0', indicating that svY[i] is positive; the value is '1', indicating that svY[i] is negative. If sv_y_sign [i] is not present in the bit stream, a value of SvYSign[i] is 1.

SvYAbsMinus1[i] equals a value of sv_y_abs_minus1[i]. A value of sv_y_abs_minus1[i] is an absolute value of svY[i] minus 1. If sv_y_abs_minus1[i] is not present in the bit stream, a value of SvYAbsMinus1[i] is 1.

In the above encoding method, neither the explicit nor implicit encoding of the SV performed by the encoding device distinguishes between long and short strings, so this method may lead to a problem that an encoding effect of the short string is better and an encoding effect of the long string is poor. For example: when the encoding device encodes the horizontal coordinate svX[i] and the longitudinal coordinate svY[i] of SV[i], it is related to an absolute value of svX[i] and an absolute value of svY[i]. For the short string, the absolute value of svX[i] and the absolute value of svY[i] are small, so the encoding efficiency is high, but for the long string, the absolute value of svX[i] and the absolute value of svY[i] are large, and there are many encoding bits, which leads to a problem of low encoding efficiency. For another example: if the encoding device encodes an identifier for all to-be-encoded strings to identify whether the SV of the to-be-encoded string is (0, −1), it is likely that the SV is not (0, −1) for the long string, and at this time it is also necessary to encode the identifier, which causes a problem of many encoding bits. Obviously, the encoding of the identifier is also unnecessary in this case.

In order to resolve the above technical problems, this disclosure mainly encodes the SV of the to-be-encoded string according to position information, or a length, or the position information and the length of the to-be-encoded string.

The technical solutions of this disclosure are described in detail below.

Embodiment 1

Figure 4:
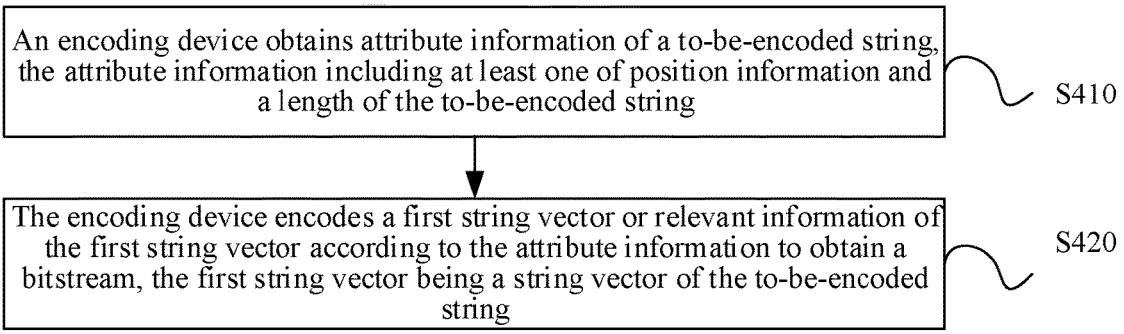
FIG. 4 is a flowchart of a method for encoding a string vector according to an embodiment of this disclosure.

FIG. 4 is a flowchart of a method for encoding a string vector according to an embodiment of this disclosure. As shown in FIG. 4, the method includes the following steps:

S410: Obtain, by an encoding device, attribute information of a to-be-encoded string, the attribute information including at least one of position information and a length of the to-be-encoded string. For example, attribute information of a pixel string in an image frame is obtained. The attribute information includes at least one of position information of the pixel string within the image frame or a length of the pixel string.

S420: Encode, by the encoding device, a first string vector or relevant information of the first string vector according to the attribute information to obtain a bitstream, the first string vector being a string vector of the to-be-encoded string. For example, information indicating a first string vector of the pixel string is encoded based on the attribute information of the pixel string to obtain a bitstream.

In some embodiments, after step S420, the encoding device outputs the bitstream.

The to-be-encoded string is a current to-be-encoded string in a current encoding unit. Thus, the to-be-encoded string is also referred to as the current to-be-encoded string.

In some embodiments, the position information of the to-be-encoded string includes at least one of: a horizontal coordinate and a longitudinal coordinate of a start point of the to-be-encoded string, and a horizontal coordinate and a longitudinal coordinate of an end point of the to-be-encoded string. The relevant information of the first string vector may be information encoded when the first string vector is implicitly encoded, for example: the relevant information of the first string vector includes a first identifier, the first identifier being used to indicate whether the first string vector is a preset string vector. Alternatively, the relevant information of the first string vector includes a second identifier, the second identifier being used to indicate whether the first string vector is in a first displacement vector prediction list.

In some embodiments, the encoding device may encode the first string vector or the relevant information of the first string vector according to the attribute information, such as the length of the to-be-encoded string, or a difference between a longitudinal coordinate of an end point and a longitudinal coordinate of a start point of the to-be-encoded string.

In addition, the bitstream carries, in addition to the first string vector or the relevant information of the first string vector, other information in an image encoding process, such as an encoding quantization coefficient of the entropy encoding.

In summary, in this disclosure, the encoding device can encode the first string vector or the relevant information of the first string vector according to at least one of the position information and the length of the to-be-encoded string, that is, for to-be-encoded strings that differ in at least one of the position information and the length, encoding methods used may be different, so as to adapt to the encoding of different to-be-encoded strings, thereby improving encoding effects of various to-be-encoded strings.

The description below is made for step S420.

Embodiment 2

Figure 5:
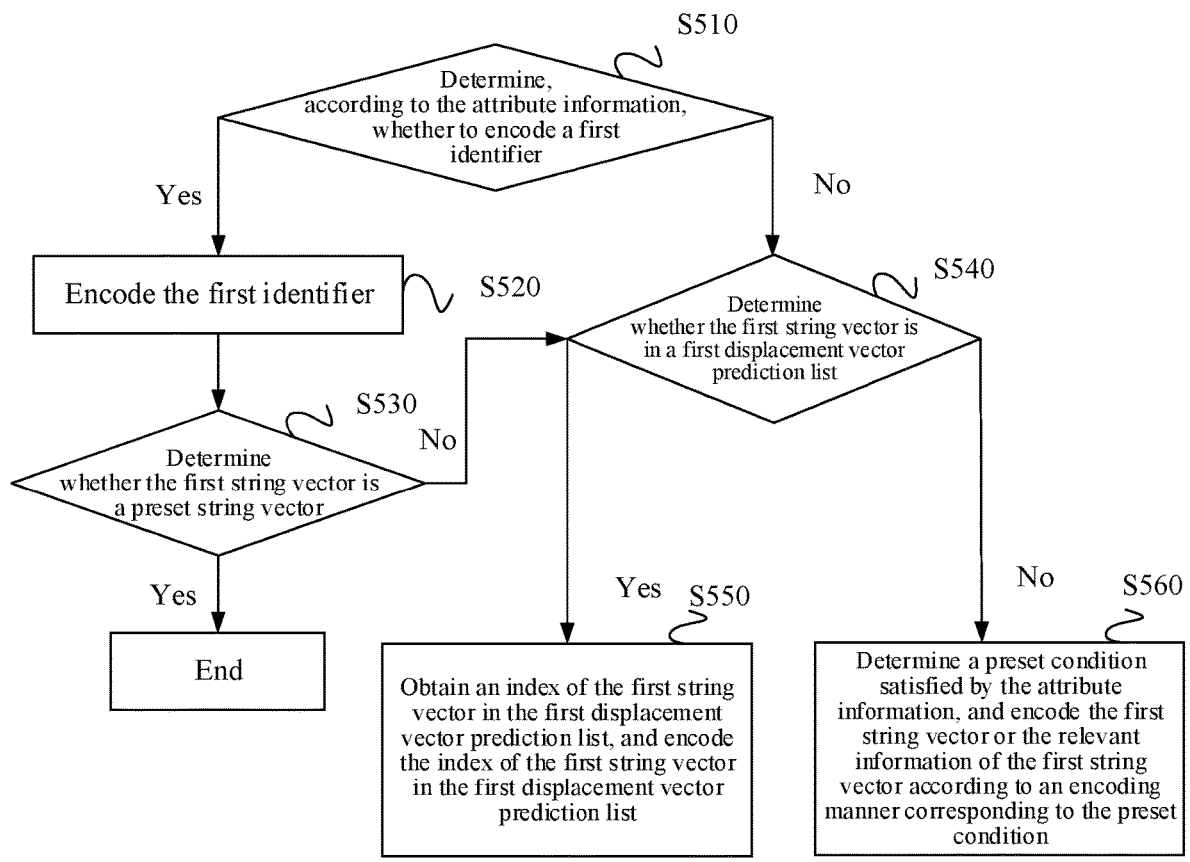
FIG. 5 is a flowchart of another method for encoding a string vector according to an embodiment of this disclosure.

FIG. 5 is a flowchart of another method for encoding a string vector according to an embodiment of this disclosure. As shown in FIG. 5, the step S420 includes the following steps:

S510: Determine, according to the attribute information, whether to encode the first identifier, if yes, S520 is executed, otherwise, S540 is executed.

S520: The encoding device encodes the first identifier.

S530: In a case that the first identifier indicates that the first string vector is not the preset string vector, the encoding device executes S540, otherwise, the process ends.

S540: The encoding device determines whether the first string vector is in the first displacement vector prediction list, if yes, S550 is executed, otherwise, S560 is executed.

S550: The encoding device obtains an index of the first string vector in the first displacement vector prediction list, and encodes the index of the first string vector in the first displacement vector prediction list.

S560: The encoding device determines a preset condition satisfied by the attribute information, and encodes the first string vector or the relevant information of the first string vector according to an encoding manner corresponding to the preset condition.

As described above, the first identifier is used to indicate whether the first string vector is the preset string vector. For example: the first identifier takes a value of 1, indicating that the first string vector is the preset string vector, and the first identifier takes a value of 0, indicating that the first string vector is not the preset string vector. Alternatively, the first identifier takes a value of 0, indicating that the first string vector is the preset string vector, and the first identifier takes a value of 1, indicating that the first string vector is not the preset string vector.

In some embodiments, in a case that a scanning direction in a prediction mode of the to-be-encoded string is a horizontal scanning direction, the preset string vector is a string vector between an upper reference string of the to-be-encoded string and the to-be-encoded string, that is, the preset string vector is a string vector in which the upper reference string of the to-be-encoded string points to the to-be-encoded string, for example: the string vector is (0, −1). In a case that the scanning direction in the prediction mode of the to-be-encoded string is a vertical scanning direction, the preset string vector is a string vector between a left reference string of the to-be-encoded string and the to-be-encoded string, that is, the preset string vector is a string vector in which the left reference string of the to-be-encoded string points to the to-be-encoded string, for example: the string vector is (−1, 0).

The longer the length of the to-be-encoded string, the more different it is from the reference string, such as the upper reference string or the left reference string. In this case, it is more impossible to adopt a string vector corresponding to this type of reference string to perform encoding, that is, the preset string vector may not be used for encoding. Thus, in this case, the encoding of the first identifier may be skipped. Conversely, the shorter the length of the to-be-encoded string, the more same it is as the reference string, such as the upper reference string or the left reference string. In this case, it is possible to adopt a string vector corresponding to this type of reference string to perform encoding, that is, the preset string vector may be used for encoding. Thus, in this case, the first identifier may be encoded.

A string vector corresponding to a reference string is used to represent a displacement of the to-be-encoded string relative to the reference string.

A length of the to-be-encoded string is determined directly by the length of the to-be-encoded string, or is determined by the difference between the longitudinal coordinate of the end point and the longitudinal coordinate of the start point of the to-be-encoded string. Based on this, an embodiment of this disclosure provides any of the following methods to determine whether to encode the first identifier:

1. Determine not to encode the first identifier in a case that the difference between the longitudinal coordinate of the end point and the longitudinal coordinate of the start point of the to-be-encoded string is greater than a first threshold, and determine to encode the first identifier in a case that the difference between the longitudinal coordinate of the end point and the longitudinal coordinate of the start point of the to-be-encoded string is less than or equal to the first threshold.

2. Determine not to encode the first identifier in a case that the length of the to-be-encoded string is greater than a second threshold, and determine to encode the first identifier in a case that the length of the to-be-encoded string is less than or equal to the second threshold.

3. Determine not to encode the first identifier in a case that the difference between the longitudinal coordinate of the end point and the longitudinal coordinate of the start point of the to-be-encoded string is greater than the first threshold and the length of the to-be-encoded string is greater than the second threshold, otherwise, determine to encode the first identifier.

4. Determine not to encode the first identifier in a case that the difference between the longitudinal coordinate of the end point and the longitudinal coordinate of the start point of the to-be-encoded string is greater than or equal to the first threshold, and determine to encode the first identifier in a case that the difference between the longitudinal coordinate of the end point and the longitudinal coordinate of the start point of the to-be-encoded string is less than the first threshold.

5. Determine not to encode the first identifier in a case that the length of the to-be-encoded string is greater than or equal to the second threshold, and determine to encode the first identifier in a case that the length of the to-be-encoded string is less than the second threshold.

6. Determine not to encode the first identifier in a case that the difference between the longitudinal coordinate of the end point and the longitudinal coordinate of the start point of the to-be-encoded string is greater than or equal to the first threshold and the length of the to-be-encoded string is greater than or equal to the second threshold, otherwise, determine to encode the first identifier.

As described above, for the to-be-encoded strings that differ in at least one of the position information and the length, the used encoding methods may be different, that is, to-be-encoded information may also be different. For example, for some to-be-encoded strings, a first identifier corresponding to the to-be-encoded string may be encoded, while for some to-be-encoded strings, an index of the to-be-encoded string in the first displacement vector prediction list may be encoded, and further, for some to-be-encoded strings, horizontal and longitudinal coordinates of the to-be-encoded string may be directly encoded. The encoding device may select different context models according to at least one of the position information and the length of the to-be-encoded string, and the context model is used to encode the to-be-encoded string.

An embodiment of this disclosure provides any of the following methods to select the context model, but the method is not limited thereto:

1. Select a first context model in a case that the difference between the longitudinal coordinate of the end point and the longitudinal coordinate of the start point of the to-be-encoded string is greater than the first threshold, and select a second context model in a case that the difference between the longitudinal coordinate of the end point and the longitudinal coordinate of the start point of the to-be-encoded string is less than or equal to the first threshold.

2. Select the first context model in a case that the length of the to-be-encoded string is greater than the second threshold, and select the second context model in a case that the length of the to-be-encoded string is less than or equal to the second threshold.

3. Select the first context model in a case that the difference between the longitudinal coordinate of the end point and the longitudinal coordinate of the start point of the to-be-encoded string is greater than the first threshold, and the length of the to-be-encoded string is greater than the second threshold, otherwise, select the second context model.

4. Select the first context model in a case that the difference between the longitudinal coordinate of the end point and the longitudinal coordinate of the start point of the to-be-encoded string is greater than or equal to the first threshold, and select the second context model in a case that the difference between the longitudinal coordinate of the end point and the longitudinal coordinate of the start point of the to-be-encoded string is less than the first threshold.

5. Select the first context model in a case that the length of the to-be-encoded string is greater than or equal to the second threshold, and select the second context model in a case that the length of the to-be-encoded string is less than the second threshold.

6. Select the first context model in a case that the difference between the longitudinal coordinate of the end point and the longitudinal coordinate of the start point of the to-be-encoded string is greater than or equal to the first threshold, and the length of the to-be-encoded string is greater than or equal to the second threshold, otherwise, select the second context model.

The first context model and the second context model are context models constructed when a context-based adaptive binary arithmetic is used to encode, but the first context model and the second context model are different, that is, the first context model is more suitable for relative to a long string, and the second context model is more suitable for relative to a short string. According to the attribute information, different context models are selected for encoding, which is conducive to improving the encoding efficiency.

The first threshold and the second threshold may be pre-configured to the encoding device, or may be dynamically configured to the encoding device, which is not limited in this disclosure.

In some embodiments, the encoding device may construct the first displacement vector prediction list, and based on this, the encoding device may select an optimal SVP of the to-be-encoded string in the first displacement vector prediction list.

In some embodiments, the first displacement vector prediction list includes, but is not limited to, at least one of:

1. A displacement vector of a historical encoded block adjacent to the to-be-encoded string in an airspace.

2. A displacement vector of a historical encoded block.

3. Including but not limited to (0, −1), (−1, 0), (−w, 0), (0, −h), (−w, −h), and the like.

4. Including but not limited to (0, start_y−end_y), (0, start_y−end_y−1), (−start_x−1, 0), (−min (start_x+len, w), 0), (−w, start_y−end_y), (−w, start_y−end_y−1).

Where, the start point of the to-be-encoded string is (start_x, start_y), the end point is (end_x, end_y), and w and h may be integers greater than 1.

A historical encoded block involved in the first displacement vector prediction list refers to an encoded image block. The historical encoded block may be understood as an encoded coding tree unit (CTU), coding unit (CU), prediction unit (PU), or transform unit (TU), an encoded string, or the like, which is not limited in this disclosure.

The historical encoded block adjacent to the to-be-encoded string may be a historical encoding unit adjacent to an encoding unit in which the to-be-encoded string is located, or may be a historical encoded string in the historical encoding unit, which is not limited in this community.

The displacement vector may be a By, a SV, or a motion vector (MV) in an inter prediction, which is not limited in this disclosure.

In some embodiments, in a case that the first string vector is in the first displacement vector prediction list, the encoding device only needs to encode the index of the first string vector in the first displacement vector prediction list, that is, an index of a SVP of the first string vector in the first displacement vector prediction list, without encoding the first string vector and a residual signal of the SVP corresponding to the first string vector. In a case that the first string vector is not in the first displacement vector prediction list, the encoding device determines the preset condition satisfied by the attribute information, and encodes the first string vector or the relevant information of the first string vector according to an encoding manner corresponding to the preset condition.

In some embodiments, the encoding device may determine an encoding method applied for the first string vector from the following methods to perform encoding, which is not limited thereto:

1. Encode the first string vector in a case that the preset condition is that the difference between the longitudinal coordinate of the end point and the longitudinal coordinate of the start point of the to-be-encoded string is less than or equal to a third threshold.

2. Encode the first string vector in a case that the preset condition is that the length of the to-be-encoded string is less than or equal to a fourth threshold.

3. Obtain residual information between the first string vector and predicted information of the first string vector, and encode an index of the predicted information and the residual information, in a case that the preset condition is that the difference between the longitudinal coordinate of the end point and the longitudinal coordinate of the start point of the to-be-encoded string is greater than the third threshold.

4. Obtain the residual information between the first string vector and the predicted information of the first string vector, and encode the index of the predicted information and the residual information, in a case that the preset condition is that the length of the to-be-encoded string is greater than the fourth threshold.

5. Obtain the residual information between the first string vector and the predicted information of the first string vector, and encode the index of the predicted information and the residual information, in a case that the preset condition is that the difference between the longitudinal coordinate of the end point and the longitudinal coordinate of the start point of the to-be-encoded string is greater than the third threshold, and the length of the to-be-encoded string is greater than the fourth threshold.

6. Obtain an index of a distance offset value and an index of a direction offset value between the first string vector and the predicted information, and encode an index of the predicted information in a second displacement vector prediction list, the index of the distance offset value and the index of the direction offset value, in a case that the preset condition is that the difference between the longitudinal coordinate of the end point and the longitudinal coordinate of the start point of the to-be-encoded string is greater than the third threshold.

7. Obtain the index of the distance offset value and the index of the direction offset value between the first string vector and the predicted information, and encode the index of the predicted information in the second displacement vector prediction list, the index of the distance offset value and the index of the direction offset value, in a case that the preset condition is that the length of the to-be-encoded string is greater than the fourth threshold.

8. Obtain the index of the distance offset value and the index of the direction offset value between the first string vector and the predicted information, and encode the index of the predicted information in the second displacement vector prediction list, the index of the distance offset value and the index of the direction offset value, in a case that the preset condition is that the difference between the longitudinal coordinate of the end point and the longitudinal coordinate of the start point of the to-be-encoded string is greater than the third threshold, and the length of the to-be-encoded string is greater than the fourth threshold.

The third threshold and the fourth threshold may be pre-configured to the encoding device, or may be dynamically configured to the encoding device, which is not limited in this disclosure.

In some embodiments, when the encoding device directly encodes the first string vector, that is, when the encoding device explicitly encodes the first string vector, the following method may be adopted, but the method is not limited thereto:

in a case that a longitudinal coordinate sv_y of the first string vector is greater than 0, the first string vector points to the lower left of the to-be-encoded string for certain based on a reference range limit, then after adding a first offset value SvOffsetX to a horizontal coordinate sv_x of the to-be-encoded string, the encoding is performed, so as to reduce encoding bits; alternatively, in a case that the horizontal coordinate sv_x of the first string vector is greater than 0, the first string vector points to the upper right of the to-be-encoded string for certain based on a reference range limit, then after adding a second offset value SvOffsetY to the longitudinal coordinate sv_y of the to-be-encoded string, the encoding is performed, so as to reduce encoding bits.

The first offset value and the second offset value are set at least to ensure that the reference string of the to-be-encoded string does not overlap with an unencoded region or the to-be-encoded string itself.

In a case that the encoding device performs encoding in a horizontal reciprocating scanning manner, the following describes methods for determining the first offset value and the second offset value in this case.

In some embodiments, in a case that the start point of the to-be-encoded string is in an even-numbered row, the first offset value SvOffsetX is a minimum value between a first value and a width of the encoding unit in which the to-be-encoded string is located, where the first value is a sum of a horizontal coordinate start_x of the start point and a length str_len of the to-be-encoded string, that is, SvOffsetX=min (start_x+str_len, width).

Coordinates of the start point and the end point described in this disclosure refer to coordinates of the start point and the end point in the encoding unit in which the to-be-encoded string is located, which is not be repeated hereafter.

Figure 6:
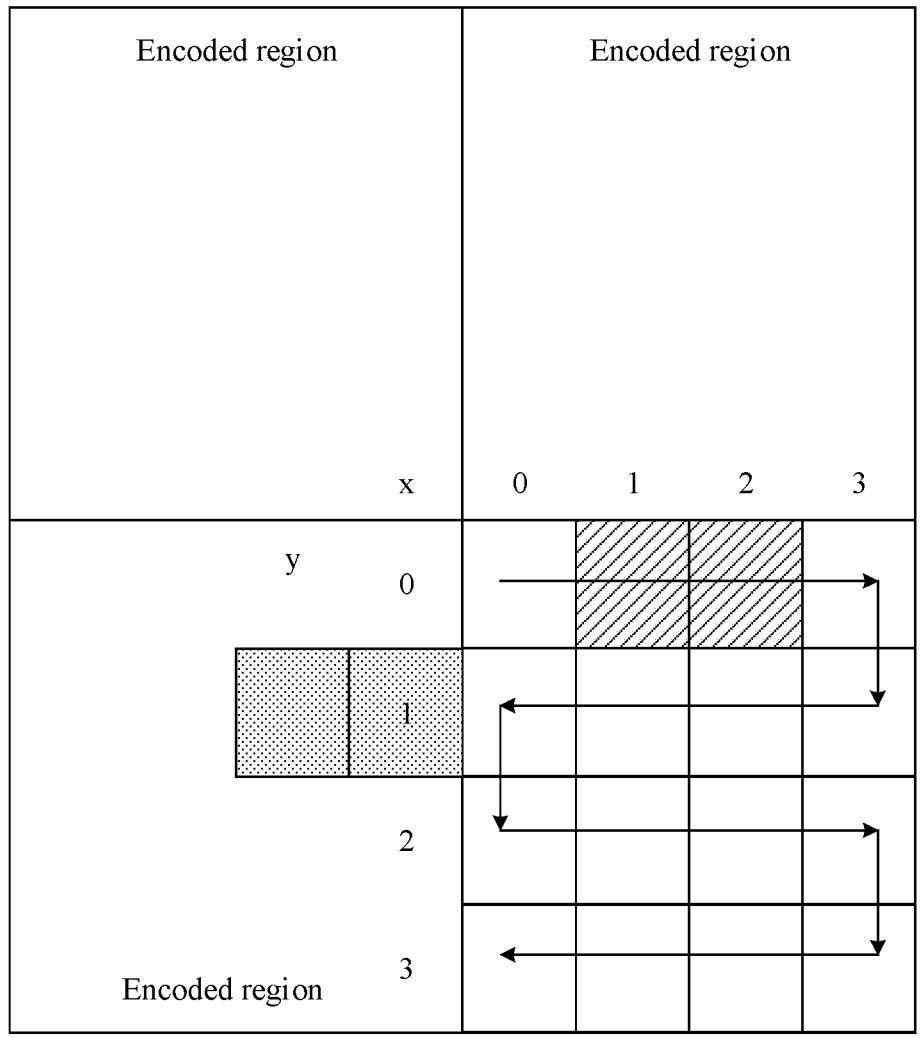
FIG. 6 is a schematic diagram of a to-be-encoded string and a reference string according to an embodiment of this disclosure.

In some embodiments, FIG. 6 is a schematic diagram of a to-be-encoded string and a reference string according to an embodiment of this disclosure. As shown in FIG. 6, each small square may represent a pixel, a diagonal stripe region is the to-be-encoded string, and a dotted region is the reference string. A start point of the to-be-encoded string shown in FIG. 6 is in row 0, that is, an even-numbered row. In order to ensure that a reference string of the to-be-encoded string does not overlap with an unencoded region or the to-be-encoded string itself, the reference string is at most adjacent to a left boundary of an encoding unit in which the to-be-encoded string is located, such as the reference string shown in FIG. 6. In this case, in order to reduce encoding bits, the SvOffsetX may be a maximum distance between the pixel in the to-be-encoded string and the left boundary of the encoding unit in which the to-be-encoded string is located, that is, a distance between a rightmost pixel in the to-be-encoded string and the left boundary of the encoding unit in which the to-be-encoded string is located, which is equal to start_x+str_len. In this case, sv_x+SvOffsetX=0, the encoding bits are reduced compared with the sv_x before encoding.

Figure 7:
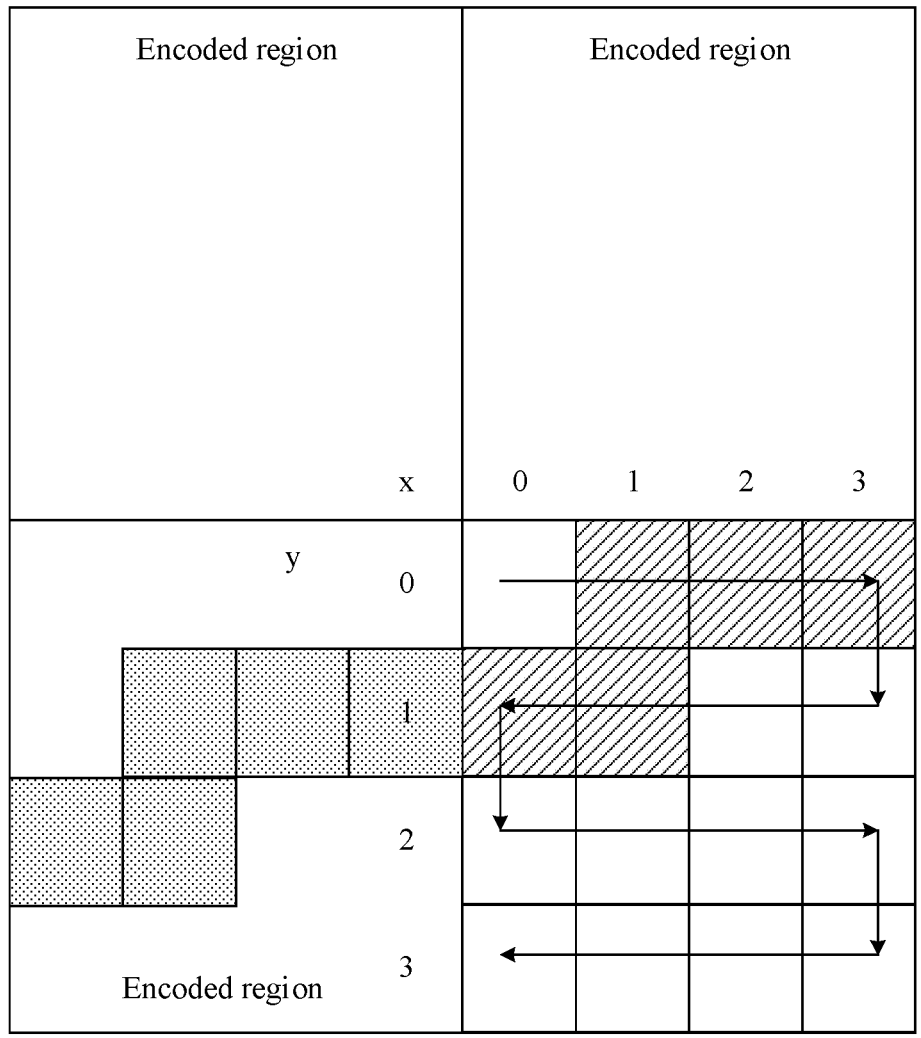
FIG. 7 is a schematic diagram of another to-be-encoded string and reference string according to an embodiment of this disclosure.

In some embodiments, FIG. 7 is a schematic diagram of another to-be-encoded string and reference string according to an embodiment of this disclosure. As shown in FIG. 7, each small square may represent a pixel, a diagonal stripe region is the to-be-encoded string, and a dotted region is the reference string. A start point of the to-be-encoded string shown in FIG. 7 is in row 0, that is, an even-numbered row. In order to ensure that a reference string of the to-be-encoded string cannot overlap with an unencoded region or the to-be-encoded string itself, the reference string is at most adjacent to a left boundary of an encoding unit in which the to-be-encoded string is located, such as the reference string shown in FIG. 7. In this case, in order to reduce encoding bits, the SvOffsetX may be a maximum distance between the pixel in the to-be-encoded string and the left boundary of the encoding unit in which the to-be-encoded string is located, that is, a distance between a rightmost pixel in the to-be-encoded string and the left boundary of the encoding unit in which the to-be-encoded string is located, which is equal to the width. In this case, sv_x+SvOffsetX=0, the encoding bits are reduced compared with the sv_x before encoding.

In some embodiments, in a case that the start point of the to-be-encoded string is in an odd-numbered row, the first offset value SvOffsetX is a sum of the horizontal coordinate of the start point and 1, that is, SvOffsetX=start_x+1.

Figure 8:
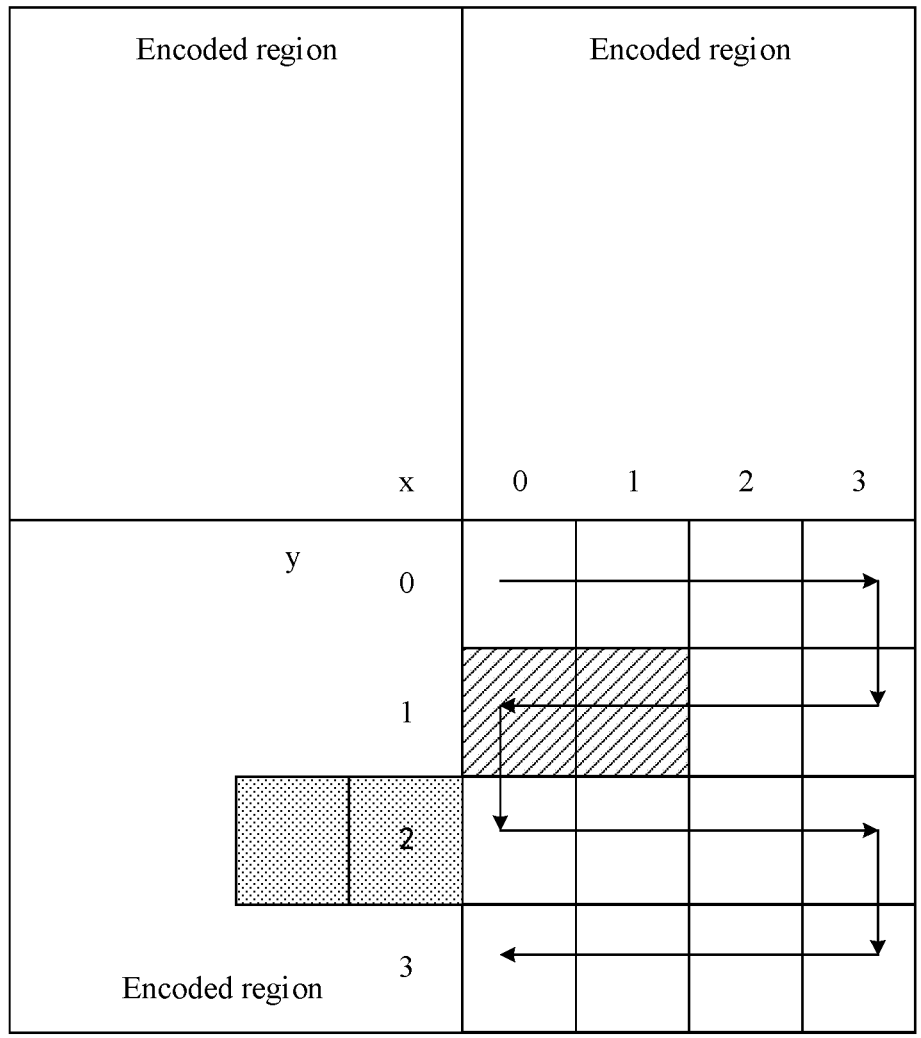
FIG. 8 is a schematic diagram of still another to-be-encoded string and reference string according to an embodiment of this disclosure.

In some embodiments, FIG. 8 is a schematic diagram of still another to-be-encoded string and reference string according to an embodiment of this disclosure. As shown in FIG. 8, each small square may represent a pixel, a diagonal stripe region is the to-be-encoded string, and a dotted region is the reference string. A start point of the to-be-encoded string shown in FIG. 8 is in row 1, that is, an odd-numbered row. In order to ensure that a reference string of the to-be-encoded string cannot overlap with an unencoded region or the to-be-encoded string itself, the reference string is at most adjacent to a left boundary of an encoding unit in which the to-be-encoded string is located, such as the reference string shown in FIG. 8. In this case, in order to reduce encoding bits, the SvOffsetX may be a maximum distance between the pixel in the to-be-encoded string and the left boundary of the encoding unit in which the to-be-encoded string is located, that is, a distance between a rightmost pixel in the to-be-encoded string and the left boundary of the encoding unit in which the to-be-encoded string is located, which is equal to start_x+1. In this case, sv_x+SvOffsetX=0, the encoding bits are reduced compared with the sv_x before encoding.

In some embodiments, in a case that a longitudinal coordinate end_y of the end point of the to-be-encoded string is greater than a second value, the first offset value SvOffsetX is the width of the encoding unit in which the to-be-encoded string is located, and the second value is a sum of the longitudinal coordinate of the start point of the to-be-encoded string and 1, that is, the second value is start_y+1.

Figure 9:
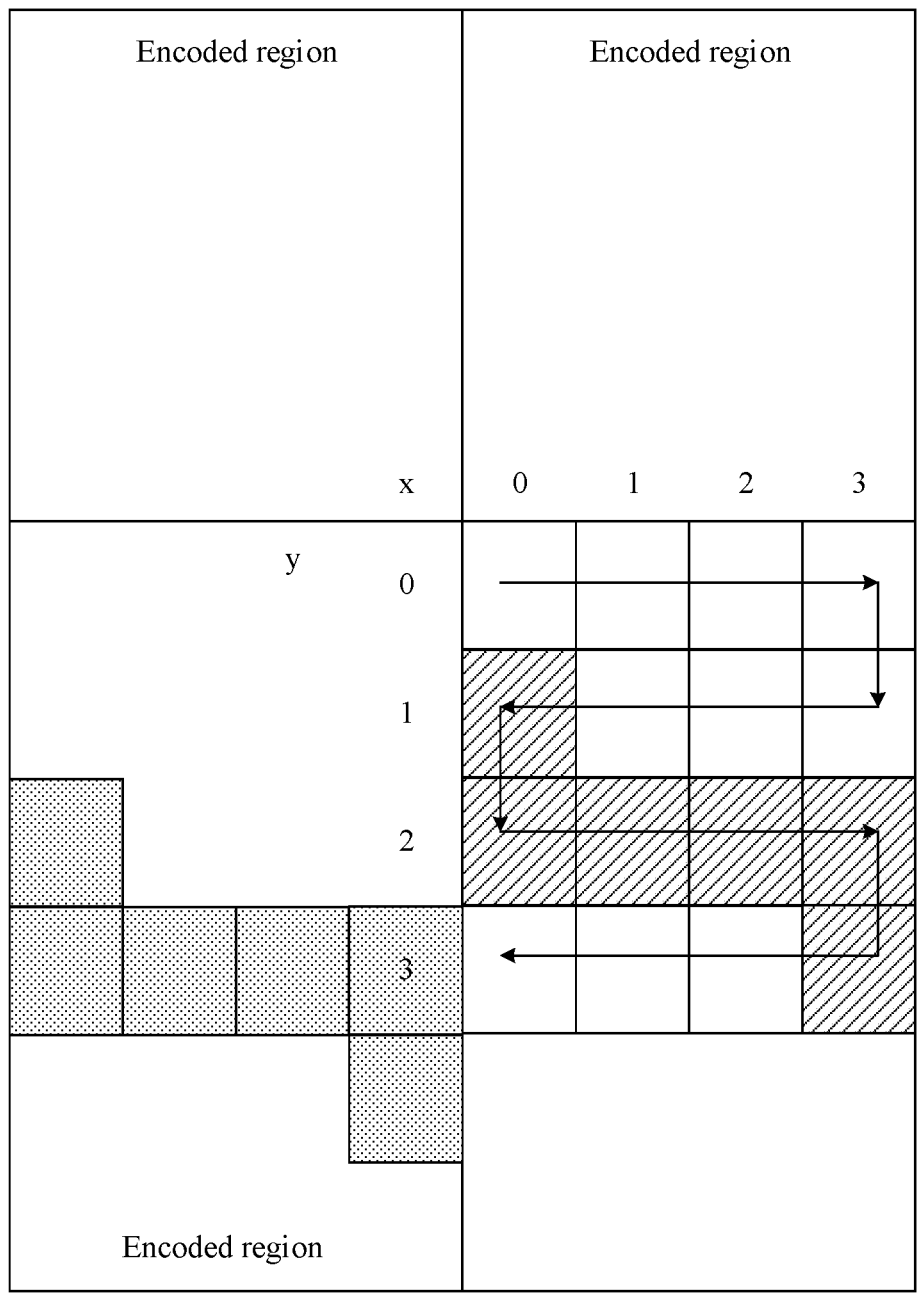
FIG. 9 is a schematic diagram of yet another to-be-encoded string and reference string according to an embodiment of this disclosure.

In some embodiments, FIG. 9 is a schematic diagram of yet another to-be-encoded string and reference string according to an embodiment of this disclosure. As shown in FIG. 9, each small square may represent a pixel, a diagonal stripe region is the to-be-encoded string, and a dotted region is the reference string. The to-be-encoded strings shown in FIG. 9 exist in multiple rows, that is, end_y>start_y+1. In order to ensure that a reference string of the to-be-encoded string cannot overlap with an unencoded region or the to-be-encoded string itself, the reference string is at most adjacent to a left boundary of an encoding unit in which the to-be-encoded string is located, such as the reference string shown in FIG. 9. In this case, in order to reduce encoding bits, the SvOffsetX may be a maximum distance between the pixel in the to-be-encoded string and the left boundary of the encoding unit in which the to-be-encoded string is located, that is, a distance between a rightmost pixel in the to-be-encoded string and the left boundary of the encoding unit in which the to-be-encoded string is located, which is equal to the width. In this case, sv_x+SvOffsetX=0, the encoding bits are reduced compared with the sv_x before encoding.

In some embodiments, in a case that the start point of the to-be-encoded string is in an odd-numbered row, the longitudinal coordinate of the end point of the to-be-encoded string is equal to the second value, that is, end_y=start_y+1, and a horizontal coordinate end_x of the end point is greater than the horizontal coordinate start_x of the start point, the first offset value is a sum of the horizontal coordinate of the end point and 1, that is, SvOffsetX=end_x+1.

Figure 10:
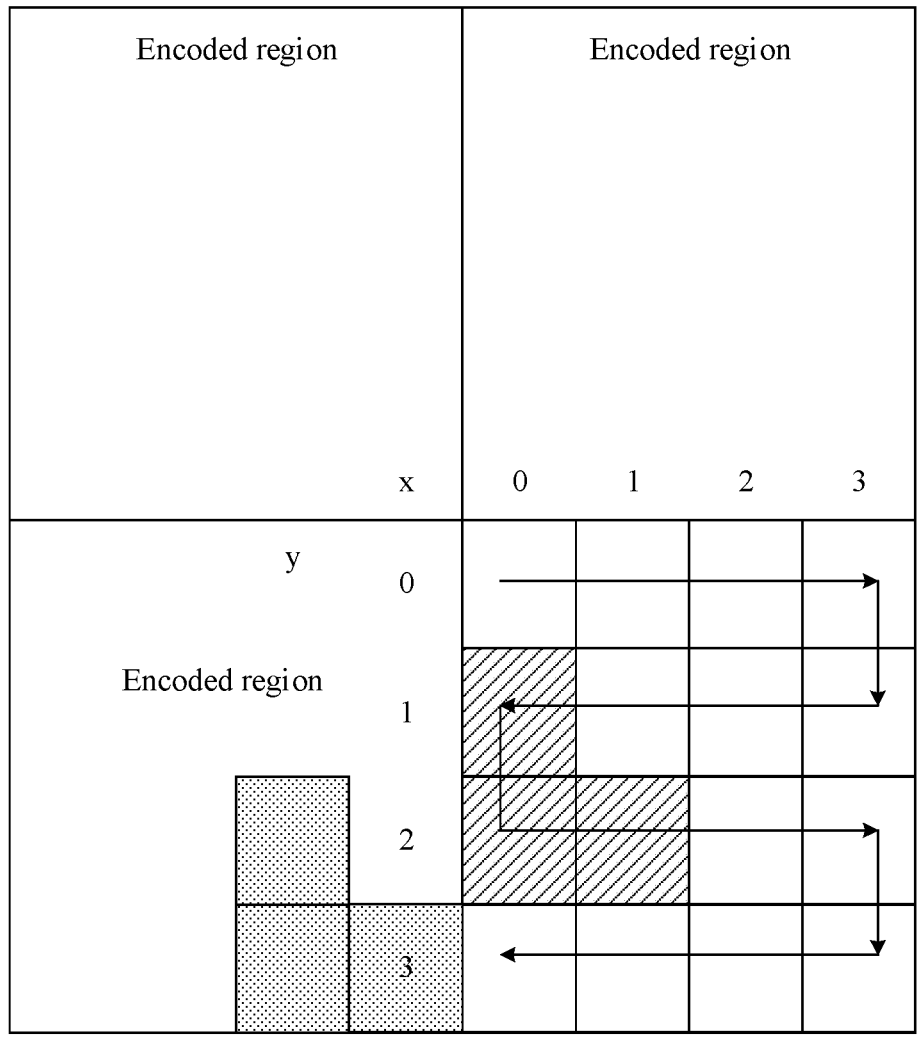
FIG. 10 is a schematic diagram of still another to-be-encoded string and reference string according to an embodiment of this disclosure.

In some embodiments, FIG. 10 is a schematic diagram of still another to-be-encoded string and reference string according to an embodiment of this disclosure. As shown in FIG. 10, each small square may represent a pixel, a diagonal stripe region is the to-be-encoded string, and a dotted region is the reference string. A start point of the to-be-encoded string shown in FIG. 10 is in row 1, that is, an odd-numbered row, end_y=start_y+1, that is, there are two to-be-encoded strings. In order to ensure that a reference string of the to-be-encoded string cannot overlap with an unencoded region or the to-be-encoded string itself, the reference string is at most adjacent to a left boundary of an encoding unit in which the to-be-encoded string is located, such as the reference string shown in FIG. 10. In this case, in order to reduce encoding bits, the SvOffsetX may be a maximum distance between the pixel in the to-be-encoded string and the left boundary of the encoding unit in which the to-be-encoded string is located, that is, a distance between a rightmost pixel in the to-be-encoded string and the left boundary of the encoding unit in which the to-be-encoded string is located, which is equal to end_x+1. In this case, sv_x+SvOffsetX=0, the encoding bits are reduced compared with the sv_x before encoding.

In some embodiments, in a case that the end point of the to-be-encoded string is in an even-numbered row, and a sum of the horizontal coordinate end_x of the end point and the horizontal coordinate sv_x of the first string vector is greater than or equal to the width of the encoding unit in which the to-be-encoded string is located, the second offset value SvOffsetY is equal to a sum of the longitudinal coordinate end_y of the end point and 1.

Figure 11:
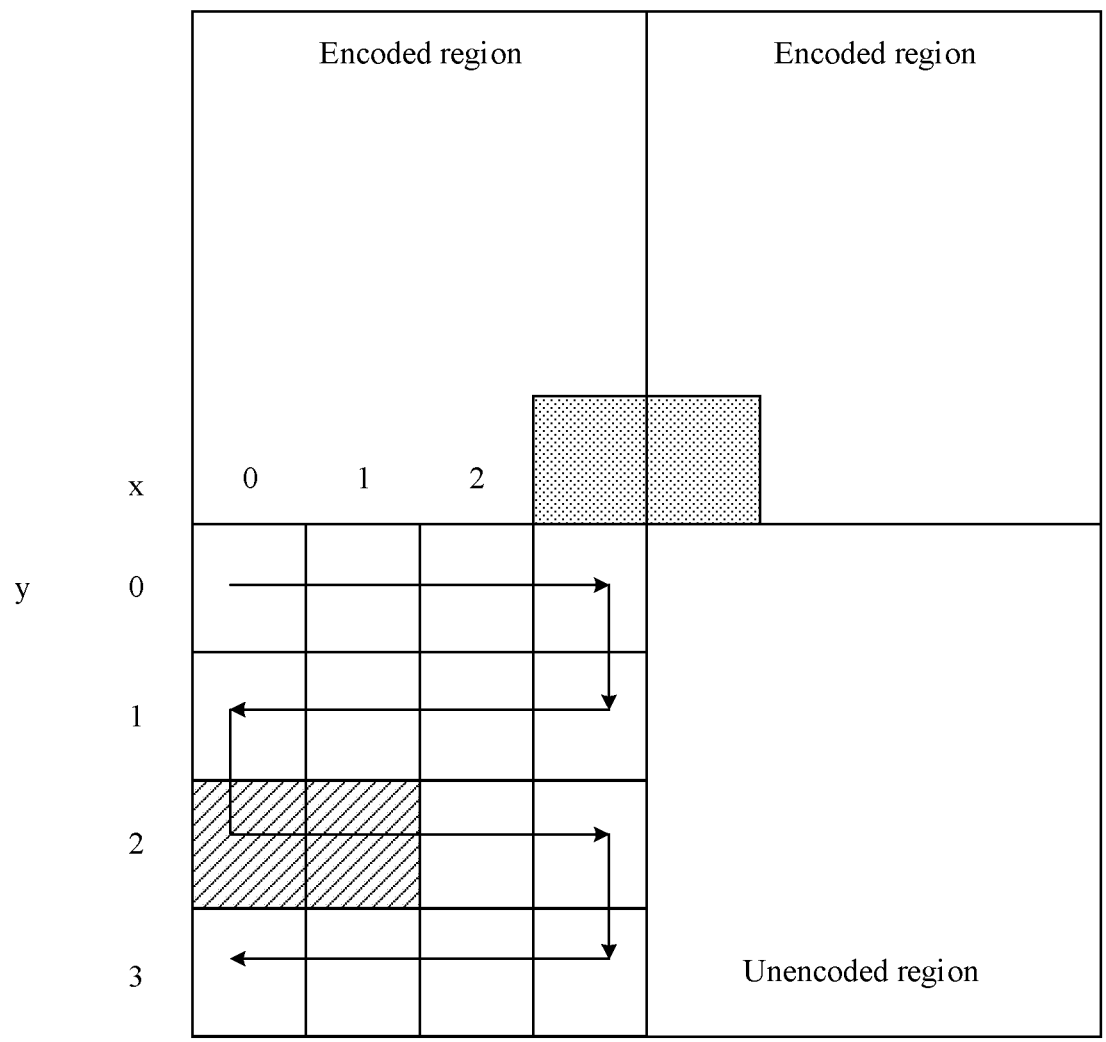
FIG. 11 is a schematic diagram of yet another to-be-encoded string and reference string according to an embodiment of this disclosure.

In some embodiments, FIG. 11 is a schematic diagram of yet another to-be-encoded string and reference string according to an embodiment of this disclosure. As shown in FIG. 11, each small square may represent a pixel, a diagonal stripe region is the to-be-encoded string, and a dotted region is the reference string. An end point of the to-be-encoded string shown in FIG. 11 is in row 2, that is, an even-numbered row, end_x=1, sv_x=3, and width=4, then end_x+sv_x=width. In order to ensure that a reference string of the to-be-encoded string cannot overlap with an unencoded region or the to-be-encoded string itself, the reference string is at most adjacent to an upper boundary of an encoding unit in which the to-be-encoded string is located, such as the reference string shown in FIG. 11. In this case, in order to reduce encoding bits, the SvOffsetY may be a maximum distance between the pixel in the to-be-encoded string and the upper boundary of the encoding unit in which the to-be-encoded string is located, which is equal to end_y+1=3. In this case, sv_y=−3, sv_y+SvOffsetY=0, the encoding bits are reduced compared with the sv_y before encoding.

In some embodiments, in a case that the encoding is performed in the horizontal reciprocating scanning manner, the end point of the to-be-encoded string is in an even-numbered row, and a sum of the horizontal coordinate of the end point and the horizontal coordinate of the first string vector is less than the width of the encoding unit in which the to-be-encoded string is located, the second offset value is equal to 0.

In some embodiments, in a case that a third value is greater than or equal to the width of the encoding unit in which the to-be-encoded string is located, the second offset value is equal to a sum of the longitudinal coordinate end_y of the end point and 1. The third value is the horizontal coordinate end_x of the end point plus the length str_len of the to-be-encoded string, the horizontal coordinate sv_x of the first string vector, and then minus 1, that is, the third value is end_x+str_len−1+sv_x.

Figure 12:
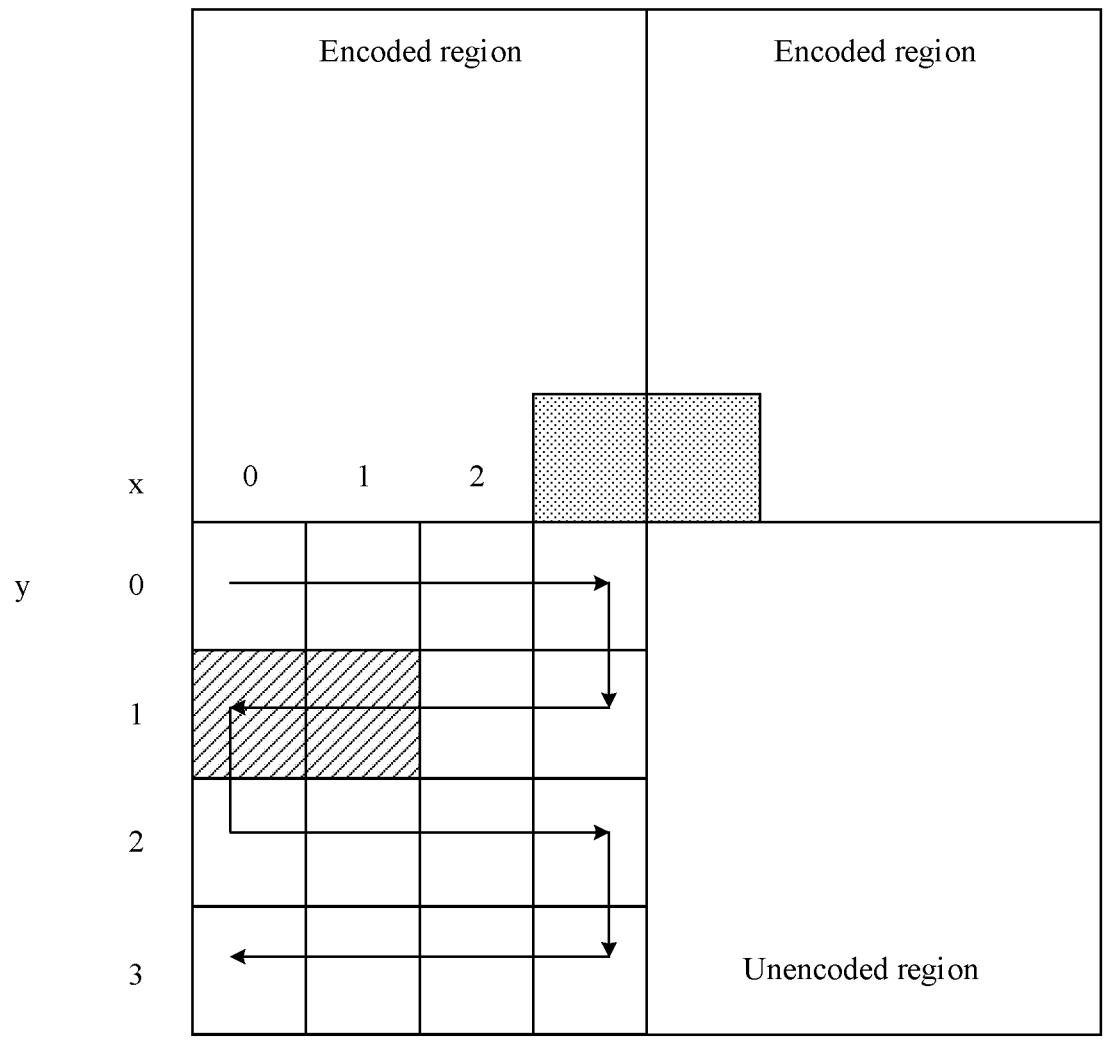
FIG. 12 is a schematic diagram of still another to-be-encoded string and reference string according to an embodiment of this disclosure.

In some embodiments, FIG. 12 is a schematic diagram of still another to-be-encoded string and reference string according to an embodiment of this disclosure. As shown in FIG. 12, each small square may represent a pixel, a diagonal stripe region is the to-be-encoded string, and a dotted region is the reference string. An end point of the to-be-encoded string shown in FIG. 12 is in row 1, that is, an odd-numbered row, end_x=0, str_len=2, and sv_x=3, then end_x+str_len−1+sv_x=4, which is equal to width=4. In order to ensure that a reference string of the to-be-encoded string cannot overlap with an unencoded region or the to-be-encoded string itself, the reference string is at most adjacent to an upper boundary of an encoding unit in which the to-be-encoded string is located, such as the reference string shown in FIG. 12. In this case, in order to reduce encoding bits, the SvOffsetY may be a maximum distance between the pixel in the to-be-encoded string and the upper boundary of the encoding unit in which the to-be-encoded string is located, which is equal to end_y+1=2. In this case, sv_y=−2, sv_y+SvOffsetY=0, the encoding bits are reduced compared with the sv_y before encoding.

In some embodiments, as described above, the encoding device obtains the residual information between the first string vector and the predicted information of the first string vector, and encodes the index of the predicted information in the second displacement vector prediction list and the residual information.

In some embodiments, the encoding device may construct the second displacement vector prediction list, and based on this, the encoding device may select an optimal SVP of the to-be-encoded string in the second displacement vector prediction list.

In some embodiments, the second displacement vector prediction list includes, but is not limited to, at least one of:

1. A displacement vector of a historical encoded block adjacent to the to-be-encoded string in an airspace.

2. A displacement vector of a historical encoded block.

3. Including but not limited to (0, −1), (−1, 0), (−w, 0), (0, −h), (−w, −h), and the like.

4. Including but not limited to (0, start_y−end_y), (0, start_y−end_y−1), (−start_x−1, 0), (−min (start_x+len, w), 0), (−w, start_y−end_y), (−w, start_y−end_y−1).

Where, the start point of the to-be-encoded string is (start_x, start_y), the end point is (end_x, end_y), and w and h may be integers greater than 1.

A historical encoded block involved in the second displacement vector prediction list refers to an encoded image block. The historical encoded block may be understood as an encoded CTU, CU, PU, or TU, an encoded string, or the like, which is not limited in this disclosure.

The historical encoded block adjacent to the to-be-encoded string may be a historical encoding unit adjacent to an encoding unit in which the to-be-encoded string is located, or may be a historical encoded string in the historical encoding unit, which is not limited in this community.

The displacement vector may be a By, a SV, or a MV in an inter prediction, which is not limited in this disclosure.

The second displacement vector prediction list and the first displacement vector prediction list may be the same as or different from each other. For example, the first displacement vector prediction list includes the second term above, that is, the displacement vector of the historical encoded block, while the second displacement vector prediction list includes the above four items.

In some embodiments, as described above, the encoding device obtains the index of the distance offset value and the index of the direction offset value between the first string vector and the predicted information, and encodes the index of the predicted information in the second displacement vector prediction list, the index of the distance offset value and the index of the direction offset value.

In some embodiments, the direction offset value between the first string vector and the predicted information svp includes: a direction offset value svd_sign_x in a horizontal coordinate direction, and a direction offset value svd_sign_y in a longitudinal coordinate direction. If the index of the direction offset value is represented by svd_sign_idx, a corresponding relationship between svd_sign_idx and svd_sign_x and svd_sign_y may be seen in Table 1.

TABLE 1

| svd_sign_idx | svd_sign_x | svd_sign_y |
|---|---|---|
| 0 | +1 | 0 |
| 1 | −1 | 0 |
| 2 | 0 | +1 |
| 3 | 0 | −1 |

If the index of the distance offset value is represented by svd_distance_index and the distance offset value is represented by svd_distance, a corresponding relationship between svd_distance_index and svd_distance may be seen in Table 2.

TABLE 2

| svd_distance_index | svd_distance |
|---|---|
| 0 | 4 |
| 1 | 8 |
| 2 | 16 |
| 3 | 32 | sv_x and sv_y may be calculated according to the following equations:

$$sv\_x = svp\_x + svd\_distance * svd\_sign\_x \quad (1)$$

$$sv\_y = svp\_y + svd\_distance * svd\_sign\_y \quad (2)$$

Where, svp_x represents a horizontal coordinate of svp, and svp_y represents a longitudinal coordinate of svp. The other parameters in equations (1) and (2) may refer to the corresponding explanations above, which are not repeated here.

In summary, in this disclosure, the encoding device may determine whether to skip the encoding of the first identifier according to at least one of the position information and the length of the to-be-encoded string, and if the encoding of the first identifier is skipped, the encoding bits may be reduced. The encoding device may further determine the satisfied preset condition according to at least one of the position information and the length of the to-be-encoded string, and encode the first string vector or the relevant information of the first string vector according to an encoding manner corresponding to the preset condition. For example, the encoding of the residual information and the index corresponding to the first string vector, direct encoding, or the like. In the direct encoding, the first offset value and the second offset value may be determined. Compared with the direct encoding scheme of the related art, this disclosure may better reduce the encoding bits. As in the above example, almost sv_x after adding the first offset value is 0, and sv_y after adding the second offset value is also 0.

Embodiment 3

Figure 13:
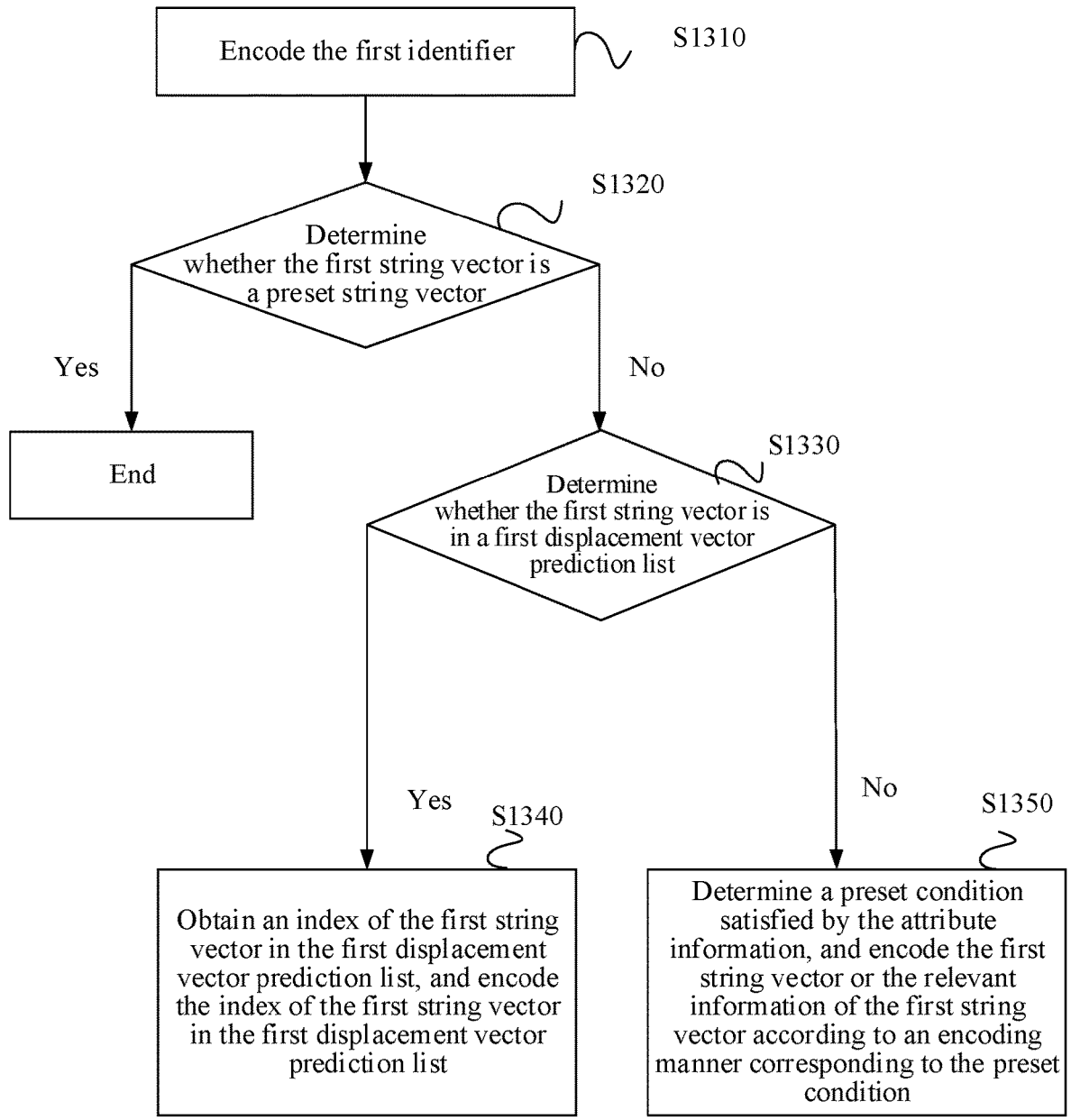
FIG. 13 is a flowchart of still another method for encoding a string vector according to an embodiment of this disclosure.

FIG. 13 is a flowchart of still another method for encoding a string vector according to an embodiment of this disclosure. As shown in FIG. 13, the step S420 includes the following steps:

S1310: The encoding device encodes the first identifier.

S1320: In a case that the first identifier indicates that the first string vector is not the preset string vector, the encoding device executes S1330, otherwise, the process ends.

S1330: The encoding device determines whether the first string vector is in the first displacement vector prediction list, if yes, S1340 is executed, otherwise, S1350 is executed.

S1340: The encoding device obtains an index of the first string vector in the first displacement vector prediction list, and encodes the index of the first string vector in the first displacement vector prediction list.

S1350: The encoding device determines a preset condition satisfied by the attribute information, and encodes the first string vector or the relevant information of the first string vector according to an encoding manner corresponding to the preset condition.

A difference between Embodiment 3 and Embodiment 2 is that Embodiment 3 does not need to determine whether to encode the first identifier according to the attribute information, and the other parts are the same. Thus, Embodiment 3 may refer to the explanations in Embodiment 2, which is not repeated in this disclosure.

Embodiment 4

Figure 14:
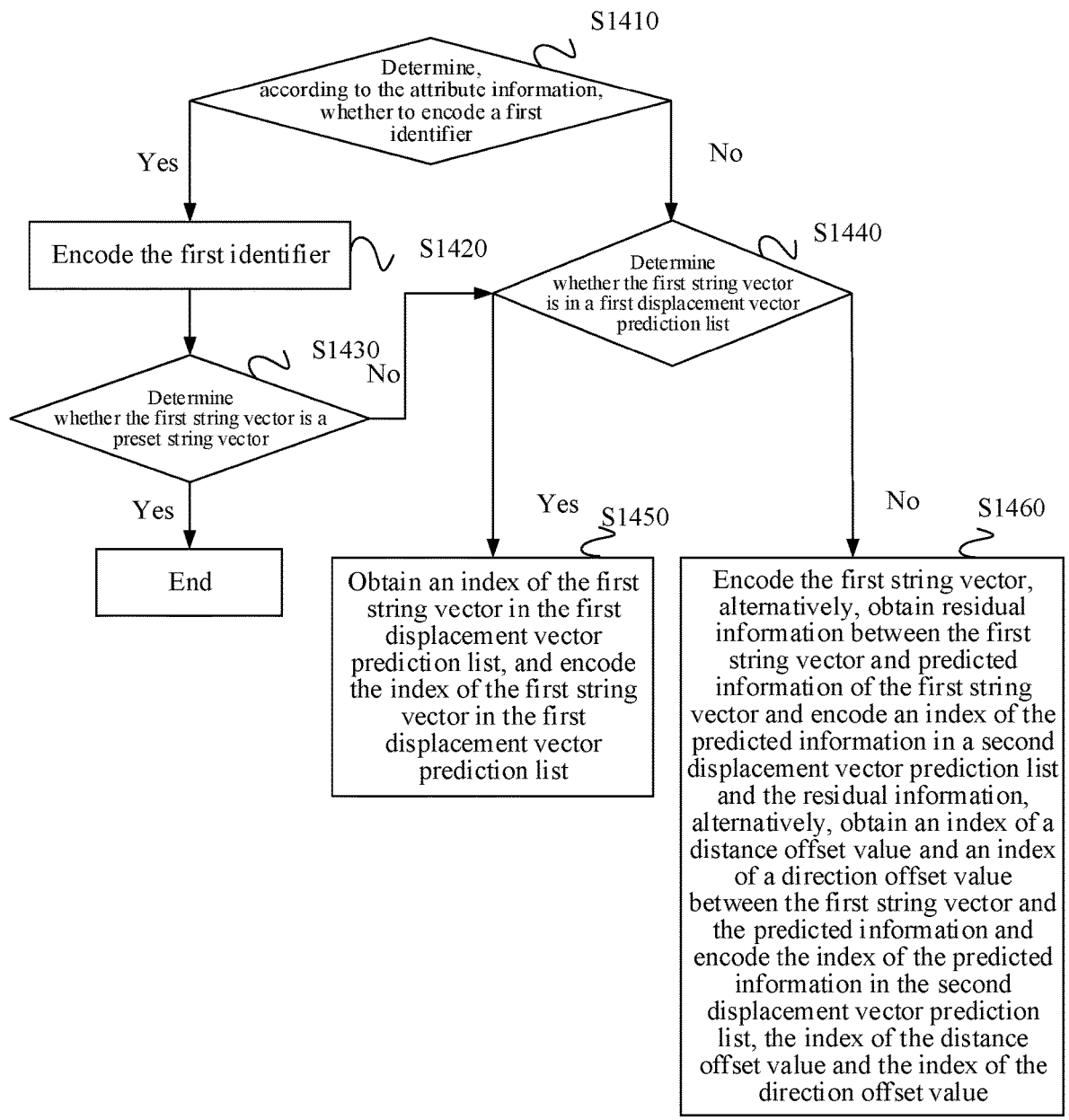
FIG. 14 is a flowchart of yet another method for encoding a string vector according to an embodiment of this disclosure.

FIG. 14 is a flowchart of yet another method for encoding a string vector according to an embodiment of this disclosure. As shown in FIG. 14, the step S420 includes the following steps:

S1410: The encoding device determines, according to the attribute information, whether to encode the first identifier, if yes, S1420 is executed, otherwise, S1440 is executed.

S1420: The encoding device encodes the first identifier.

S1430: In a case that the first identifier indicates that the first string vector is not the preset string vector, the encoding device executes S1440, otherwise, the process ends.

S1440: The encoding device determines whether the first string vector is in the first displacement vector prediction list, if yes, S1450 is executed, otherwise, S1460 is executed.

S1450: The encoding device obtains an index of the first string vector in the first displacement vector prediction list, and encodes the index of the first string vector in the first displacement vector prediction list.

S1460: The encoding device encodes the first string vector, alternatively, obtains residual information between the first string vector and predicted information of the first string vector and encodes an index of the predicted information in a second displacement vector prediction list and the residual information, alternatively, obtains an index of a distance offset value and an index of a direction offset value between the first string vector and the predicted information and encodes the index of the predicted information in the second displacement vector prediction list, the index of the distance offset value and the index of the direction offset value.

A difference between Embodiment 4 and Embodiment 2 is that Embodiment 4 does not need to determine the preset condition satisfied by the attribute information, and encode the first string vector or the relevant information of the first string vector according to an encoding manner corresponding to the preset condition. Instead, Embodiment 4 directly obtains the residual information between the first string vector and the predicted information of the first string vector and encodes the index of the predicted information in the second displacement vector prediction list and the residual information, alternatively, obtains the index of the distance offset value and the index of the direction offset value between the first string vector and the predicted information and encodes the index of the predicted information in the second displacement vector prediction list, the index of the distance offset value and the index of the direction offset value. The other parts are the same. Thus, Embodiment 4 may refer to the explanations in Embodiment 2, which is not repeated in this disclosure.

The methods for encoding the string vector according to the embodiments of this disclosure are not limited to Embodiments 1 to 4. In fact, this disclosure describes a separate method for encoding a string vector, as long as the encoding method is combined with the attribute information of the to-be-encoded string. This disclosure describes a combination of at least two encoding methods, such as a combination of at least two methods below: using the method for encoding the first identifier to encode the index of the first string vector in the first displacement vector prediction list, and using a direct encoding method to encode the index of the predicted information in the second displacement vector prediction list and the residual information, and encode the index of the predicted information in the second displacement vector prediction list, the index of the distance offset value and the index of the direction offset value. It is sufficient as long as at least one encoding method is performed in combination with the attribute information of the to-be-encoded string, for example: determining, according to the attribute information, whether to encode the first identifier; encoding the first identifier in a case that it is determined to encode the first identifier; and in a case that it is determined not to encode the first identifier or it is determined that the first string vector is not the preset string vector, any of the encoding methods of the string vector may be used, such as direct encoding of the first string vector. The direct encoding method may be a direct encoding method, or a direct encoding method according to an embodiment of this disclosure, which is not limited in this disclosure.

Embodiment 5

Figure 15:
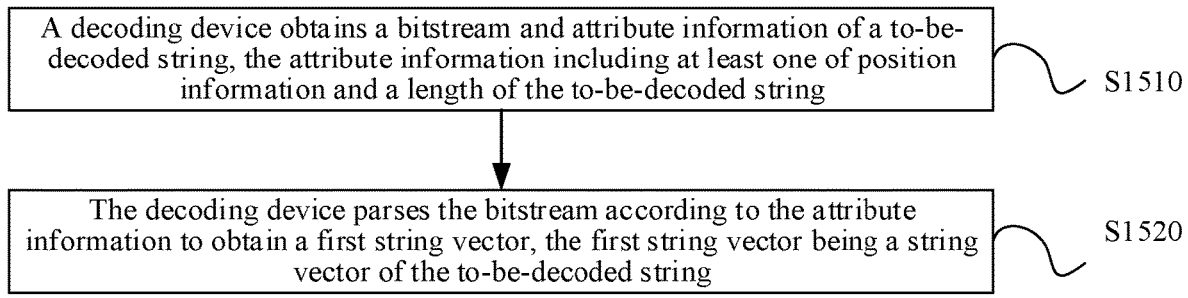
FIG. 15 is a flowchart of a method for decoding a string vector according to an embodiment of this disclosure.

FIG. 15 is a flowchart of a method for decoding a string vector according to an embodiment of this disclosure. As shown in FIG. 15, the method includes the following steps:

S1510: A decoding device obtains a bitstream and attribute information of a to-be-decoded string, the attribute information including at least one of position information and a length of the to-be-decoded string.

S1520: The decoding device parses the bitstream according to the attribute information to obtain a first string vector, the first string vector being a string vector of the to-be-decoded string.

The to-be-decoded string is a current to-be-decoded string in a current decoding unit. Thus, the to-be-decoded string is also referred to as the current to-be-decoded string.

In some embodiments, the position information of the to-be-decoded string includes at least one of: a horizontal coordinate and a longitudinal coordinate of a start point of the to-be-decoded string, and a horizontal coordinate and a longitudinal coordinate of an end point of the to-be-decoded string.

In some embodiments, the decoding device may decode the first string vector or the relevant information of the first string vector according to the attribute information, such as the length of the to-be-decoded string, or a difference between a longitudinal coordinate of an end point and a longitudinal coordinate of a start point of the to-be-decoded string.

In summary, in this disclosure, the decoding device may decode the first string vector or the relevant information of the first string vector according to at least one of the position information and the length of the to-be-decoded string, that is, for to-be-decoded strings that differ in at least one of the position information and the length, decoding methods used may be different, so as to adapt to the decoding of different to-be-decoded strings, thereby improving decoding effects of various to-be-decoded strings.

Embodiment 6

Figure 16:
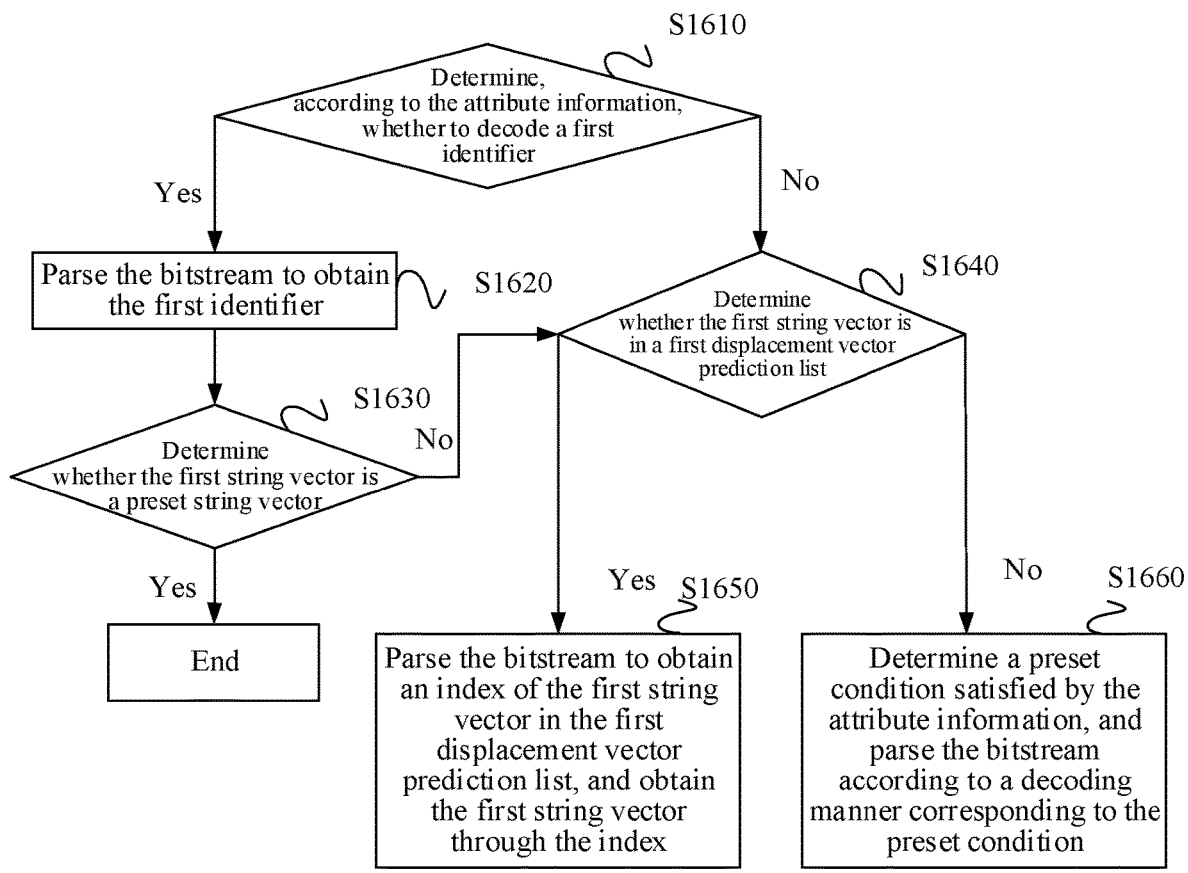
FIG. 16 is a flowchart of another method for decoding a string vector according to an embodiment of this disclosure.

FIG. 16 is a flowchart of another method for decoding a string vector according to an embodiment of this disclosure. As shown in FIG. 16, the step S1520 includes the following steps:

S1610: The decoding device determines, according to the attribute information, whether to decode the first identifier, if yes, S1620 is executed, otherwise, S1640 is executed.

S1620: The decoding device parses the bitstream to obtain the first identifier.

S1630: In a case that the first identifier indicates that the first string vector is not a preset string vector, the decoding device executes S1640, otherwise, the process ends.

S1640: The decoding device determines whether the first string vector is in a first displacement vector prediction list, if yes, S1650 is executed, otherwise, S1660 is executed.

S1650: The decoding device parses the bitstream to obtain an index of the first string vector in the first displacement vector prediction list and obtains the first string vector through the index.

S1660: Determine a preset condition satisfied by the attribute information, and parse the bitstream according to a decoding manner corresponding to the preset condition.

In some embodiments, in a case that a scanning direction in a prediction mode of the to-be-decoded string is a horizontal scanning direction, the preset string vector is a string vector between an upper reference string of the to-be-decoded string and the to-be-decoded string, for example: the string vector is (0, −1). In a case that the scanning direction in the prediction mode of the to-be-decoded string is a vertical scanning direction, the preset string vector is a string vector between a left reference string of the to-be-decoded string and the to-be-decoded string, for example: the string vector is (−1, 0).

The longer the length of the to-be-decoded string, the more different it is from the reference string, such as the upper reference string or the left reference string. In this case, it is more impossible to adopt a string vector corresponding to this type of reference string to perform decoding, that is, the preset string vector may not be used for decoding. Thus, in this case, the decoding of the first identifier may be skipped. Conversely, the shorter the length of the to-be-decoded string, the more same it is as the reference string, such as the upper reference string or the left reference string. In this case, it is possible to adopt a string vector corresponding to this type of reference string to perform decoding, that is, the preset string vector may be used for decoding. Thus, in this case, the first identifier may be decoded.

A string vector corresponding to a reference string is the following string vector, and the string vector is used to represent a displacement of the to-be-decoded string relative to the reference string.

A length of the to-be-decoded string may be determined directly by the length of the to-be-decoded string, or may be determined by the difference between the longitudinal coordinate of the end point and the longitudinal coordinate of the start point of the to-be-decoded string. Based on this, an embodiment of this disclosure provides any of the following methods to determine whether to decode the first identifier, but the method is not limited thereto:

1. Determine not to decode the first identifier in a case that the difference between the longitudinal coordinate of the end point and the longitudinal coordinate of the start point of the to-be-decoded string is greater than a first threshold, and determine to decode the first identifier in a case that the difference between the longitudinal coordinate of the end point and the longitudinal coordinate of the start point of the to-be-decoded string is less than or equal to the first threshold.

2. Determine not to decode the first identifier in a case that the length of the to-be-decoded string is greater than a second threshold, and determine to decode the first identifier in a case that the length of the to-be-decoded string is less than or equal to the second threshold.

3. Determine not to decode the first identifier in a case that the difference between the longitudinal coordinate of the end point and the longitudinal coordinate of the start point of the to-be-decoded string is greater than the first threshold and the length of the to-be-decoded string is greater than the second threshold, otherwise, determine to decode the first identifier.

4. Determine not to decode the first identifier in a case that the difference between the longitudinal coordinate of the end point and the longitudinal coordinate of the start point of the to-be-decoded string is greater than or equal to the first threshold, and determine to decode the first identifier in a case that the difference between the longitudinal coordinate of the end point and the longitudinal coordinate of the start point of the to-be-decoded string is less than the first threshold.

5. Determine not to decode the first identifier in a case that the length of the to-be-decoded string is greater than or equal to the second threshold, and determine to decode the first identifier in a case that the length of the to-be-decoded string is less than the second threshold.

6. Determine not to decode the first identifier in a case that the difference between the longitudinal coordinate of the end point and the longitudinal coordinate of the start point of the to-be-decoded string is greater than or equal to the first threshold and the length of the to-be-decoded string is greater than or equal to the second threshold, otherwise, determine to decode the first identifier.

As described above, for the to-be-decoded strings that differ in at least one of the position information and the length, the decoding methods to be used may be different, that is, to-be-decoded information may also be different. For example, for some to-be-decoded strings, a first identifier corresponding to the to-be-decoded string may be decoded, while for some to-be-decoded strings, an index of the to-be-decoded string in the first displacement vector prediction list may be decoded, and further, for some to-be-decoded strings, horizontal and longitudinal coordinates of the to-be-decoded string may be directly decoded. Based on this, the decoding device may select different context models according to at least one of the position information and the length of the to-be-decoded string.

An embodiment of this disclosure provides any of the following methods to select the context model, but the method is not limited thereto:

1. Select a first context model in a case that the difference between the longitudinal coordinate of the end point and the longitudinal coordinate of the start point of the to-be-decoded string is greater than the first threshold, and select a second context model in a case that the difference between the longitudinal coordinate of the end point and the longitudinal coordinate of the start point of the to-be-decoded string is less than or equal to the first threshold.

2. Select the first context model in a case that the length of the to-be-decoded string is greater than the second threshold, and select the second context model in a case that the length of the to-be-decoded string is less than or equal to the second threshold.

3. Select the first context model in a case that the difference between the longitudinal coordinate of the end point and the longitudinal coordinate of the start point of the to-be-decoded string is greater than the first threshold, and the length of the to-be-decoded string is greater than the second threshold, otherwise, select the second context model.

4. Select the first context model in a case that the difference between the longitudinal coordinate of the end point and the longitudinal coordinate of the start point of the to-be-decoded string is greater than or equal to the first threshold, and select the second context model in a case that the difference between the longitudinal coordinate of the end point and the longitudinal coordinate of the start point of the to-be-decoded string is less than the first threshold.

5. Select the first context model in a case that the length of the to-be-decoded string is greater than or equal to the second threshold, and select the second context model in a case that the length of the to-be-decoded string is less than the second threshold.

6. Select the first context model in a case that the difference between the longitudinal coordinate of the end point and the longitudinal coordinate of the start point of the to-be-decoded string is greater than or equal to the first threshold, and the length of the to-be-decoded string is greater than or equal to the second threshold, otherwise, select the second context model.

The first context model and the second context model are different, that is, the first context model is more suitable for relative to a long string, and the second context model is more suitable for relative to a short string. This disclosure mainly focuses on selecting different context models according to the attribute information, but does not pay attention to the context models themselves.

The first threshold and the second threshold may be pre-configured to the decoding device, or may be dynamically configured to the decoding device, which is not limited in this disclosure.

In some embodiments, the decoding device may construct the first displacement vector prediction list, and based on this, the decoding device may select an optimal SVP of the to-be-decoded string in the first displacement vector prediction list.

In some embodiments, the first displacement vector prediction list includes, but is not limited to, at least one of:

1. A displacement vector of a historical decoded block adjacent to the to-be-decoded string in an airspace.

2. A displacement vector of a historical decoded block.

3. Including but not limited to (0, −1), (−1, 0), (−w, 0), (0, −h), (−w, −h), and the like.

4. Including but not limited to (0, start_y−end_y), (0, start_y−end_y−1), (−start_x−1, 0), (−min (start_x+len, w), 0), (−w, start_y−end_y), (−w, start_y−end_y−1).

Where, the start point of the to-be-decoded string is (start_x, start_y), the end point is (end_x, end_y), and w and h may be integers greater than 1.

A historical decoded block involved in the first displacement vector prediction list refers to a decoded image block. The historical decoded block may be understood as a decoded image block, a decoded string, or the like, which is not limited in this disclosure.

The historical decoded block adjacent to the to-be-decoded string may be a historical decoding unit adjacent to a decoding unit in which the to-be-decoded string is located, or may be a historical decoded string in the historical decoding unit, which is not limited in this disclosure.

The displacement vector may be a By, a SV, or a MV in an inter prediction, which is not limited in this disclosure.

In some embodiments, in a case that the first string vector is in the first displacement vector prediction list, the decoding device only needs to decode the index of the first string vector in the first displacement vector prediction list, that is, an index of a SVP of the first string vector in the first displacement vector prediction list. In a case that the first string vector is not in the first displacement vector prediction list, the decoding device determines the preset condition satisfied by the attribute information, and decodes the first string vector or the relevant information of the first string vector according to a decoding manner corresponding to the preset condition.

In some embodiments, the decoding device may determine a decoding method applied for the first string vector from the following methods to perform decoding:

1. Parse the bitstream to obtain the first string vector in a case that the preset condition is that the difference between the longitudinal coordinate of the end point and the longitudinal coordinate of the start point of the to-be-decoded string is less than or equal to a third threshold.

2. Parse the bitstream to obtain the first string vector in a case that the preset condition is that the length of the to-be-decoded string is less than or equal to a fourth threshold.

3. Parse the bitstream to obtain the residual information between the first string vector and the predicted information of the first string vector and the index of the predicted information in the second displacement vector prediction list, and obtain the first string vector according to the residual information and the index, in a case that the preset condition is that the difference between the longitudinal coordinate of the end point and the longitudinal coordinate of the start point of the to-be-decoded string is greater than the third threshold.

4. Parse the bitstream to obtain the residual information between the first string vector and the predicted information of the first string vector and the index of the predicted information in the second displacement vector prediction list, and obtain the first string vector according to the residual information and the index, in a case that the preset condition is that the length of the to-be-decoded string is greater than the fourth threshold.

5. Parse the bitstream to obtain the residual information between the first string vector and the predicted information of the first string vector and the index of the predicted information in the second displacement vector prediction list, and obtain the first string vector according to the residual information and the index, in a case that the preset condition is that the difference between the longitudinal coordinate of the end point and the longitudinal coordinate of the start point of the to-be-decoded string is greater than the third threshold, and the length of the to-be-decoded string is greater than the fourth threshold.

6. Parse the bitstream to obtain the index of the distance offset value and the index of the direction offset value between the first string vector and the predicted information and the index of the predicted information in the second displacement vector prediction list, and obtain the first string vector according to the index of the distance offset value, the index of the direction offset value and the index of the predicted information in the second displacement vector prediction list, in a case that the preset condition is that the difference between the longitudinal coordinate of the end point and the longitudinal coordinate of the start point of the to-be-decoded string is greater than the third threshold.

7. Parse the bitstream to obtain the index of the distance offset value and the index of the direction offset value between the first string vector and the predicted information and the index of the predicted information in the second displacement vector prediction list, and obtain the first string vector according to the index of the distance offset value, the index of the direction offset value and the index of the predicted information in the second displacement vector prediction list, in a case that the preset condition is that the length of the to-be-decoded string is greater than the fourth threshold.

8. Parse the bitstream to obtain the index of the distance offset value and the index of the direction offset value between the first string vector and the predicted information and the index of the predicted information in the second displacement vector prediction list, and obtain the first string vector according to the index of the distance offset value, the index of the direction offset value and the index of the predicted information in the second displacement vector prediction list, in a case that the preset condition is that the difference between the longitudinal coordinate of the end point and the longitudinal coordinate of the start point of the to-be-decoded string is greater than the third threshold, and the length of the to-be-decoded string is greater than the fourth threshold.

The third threshold and the fourth threshold may be pre-configured to the decoding device, or may be dynamically configured to the decoding device, which is not limited in this disclosure.

In some embodiments, when the decoding device directly decodes the first string vector, the following method may be adopted, but the method is not limited thereto:

in a case that a longitudinal coordinate sv_y of the first string vector is greater than 0, the first string vector points to the lower left of the to-be-decoded string for certain based on a reference range limit, then a first offset value SvOffsetX is subtracted from the parsed horizontal coordinate to obtain a horizontal coordinate sv_x of the first string vector; alternatively, in a case that the horizontal coordinate sv_x of the first string vector is greater than 0, the first string vector points to the upper right of the to-be-decoded string for certain based on a reference range limit, then a second offset value SvOffsetY is subtracted from the parsed longitudinal coordinate to obtain the longitudinal coordinate sv_y of the first string vector.

Reference may be made to Embodiment 2 regarding how to determine the first offset value and the second offset value, which is not repeated in this disclosure.

In some embodiments, as described above, the decoding device may parse the bitstream to obtain the residual information between the first string vector and the predicted information of the first string vector and the index of the predicted information in the second displacement vector prediction list, and obtain the first string vector according to the residual information and the index.

In some embodiments, the decoding device may construct the second displacement vector prediction list, and based on this, the decoding device may select an optimal SVP of the to-be-decoded string in the second displacement vector prediction list.

In some embodiments, the second displacement vector prediction list includes, but is not limited to, at least one of:

1. A displacement vector of a historical decoded block adjacent to the to-be-decoded string in an airspace.

2. A displacement vector of a historical decoded block.

3. Including but not limited to (0, −1), (−1, 0), (−w, 0), (0, −h), (−w, −h), and the like.

4. Including but not limited to (0, start_y−end_y), (0, start_y−end_y−1), (−start_x−1, 0), (−min (start_x+len, w), 0), (−w, start_y−end_y), (−w, start_y−end_y−1).

Where, the start point of the to-be-decoded string is (start_x, start_y), the end point is (end_x, end_y), and w and h may be integers greater than 1.

A historical decoded block involved in the second displacement vector prediction list refers to a decoded image block. The historical decoded block may be understood as a decoded image block, a decoded string, or the like, which is not limited in this disclosure.

The historical decoded block adjacent to the to-be-decoded string may be a historical decoding unit adjacent to a decoding unit in which the to-be-decoded string is located, or may be a historical decoded string in the historical decoding unit, which is not limited in this disclosure.

The displacement vector may be a By, a SV, or a MV in an inter prediction, which is not limited in this disclosure.

The second displacement vector prediction list and the first displacement vector prediction list may be the same as or different from each other. For example, the first displacement vector prediction list includes the second term above, that is, the displacement vector of the historical decoded block, while the second displacement vector prediction list includes the above four items.

In some embodiments, as described above, the decoding device may parse the bitstream to obtain the index of the distance offset value and the index of the direction offset value between the first string vector and the predicted information and the index of the predicted information in the second displacement vector prediction list, and obtain the first string vector according to the index of the distance offset value, the index of the direction offset value and the index of the predicted information in the second displacement vector prediction list.

In some embodiments, the direction offset value between the first string vector and the predicted information svp includes: a direction offset value svd_sign_x in a horizontal coordinate direction, and a direction offset value svd_sign_y in a longitudinal coordinate direction. If the index of the direction offset value is represented by svd_sign_idx, a corresponding relationship between svd_sign_idx and svd_sign_x and svd_sign_y may be seen in Table 1 above.

If the index of the distance offset value is represented by svd_distance_index and the distance offset value is represented by svd_distance, a corresponding relationship between svd_distance_index and svd_distance may be seen in Table 2 above.

sv_x and sv_y may be calculated according to the following equations:

$$sv\_x = svp\_x + svd\_distance * svd\_sign\_x \quad (1)$$

$$sv\_y = svp\_y + svd\_distance * svd\_sign\_y \quad (2)$$

Where, svp_x represents a horizontal coordinate of svp, and svp_y represents a longitudinal coordinate of svp. The other parameters in equations (1) and (2) may refer to the corresponding explanations above, which are not repeated here.

In summary, in this disclosure, the decoding device can determine whether to skip the decoding of the first identifier according to at least one of the position information and the length of the to-be-decoded string, and if the decoding of the first identifier is skipped, the decoding efficiency may be improved. The decoding device may further determine the satisfied preset condition according to at least one of the position information and the length of the to-be-decoded string, and decode the first string vector or the relevant information of the first string vector according to a decoding manner corresponding to the preset condition. For example, the decoding of the residual information and the index corresponding to the first string vector, direct decoding, or the like. In the direct decoding, the first offset value and the second offset value may be determined. Compared with the direct decoding scheme of the related art, this disclosure may better reduce the decoding bits.

Embodiment 7

Figure 17:
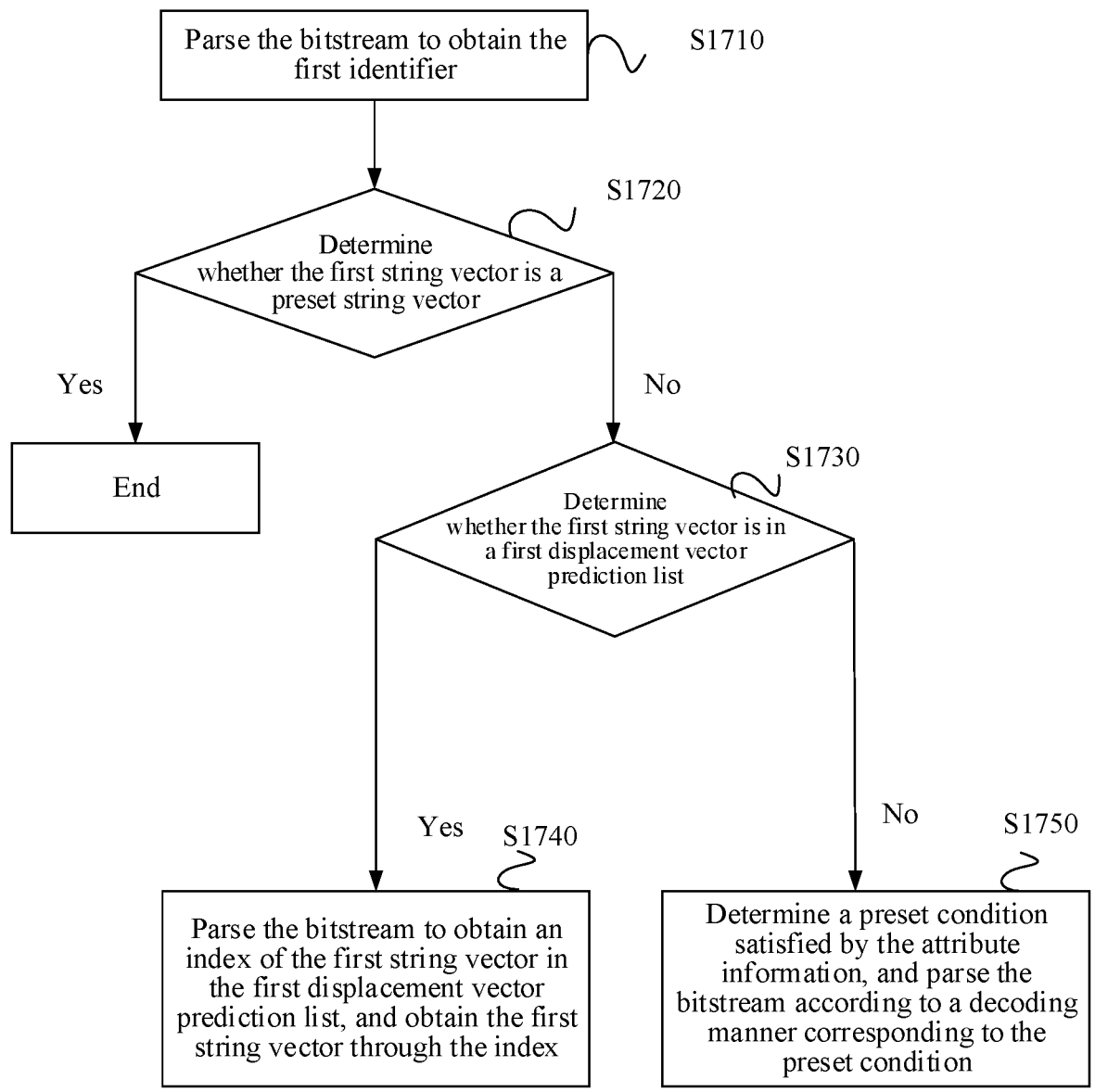
FIG. 17 is a flowchart of still another method for decoding a string vector according to an embodiment of this disclosure.

FIG. 17 is a flowchart of still another method for decoding a string vector according to an embodiment of this disclosure. As shown in FIG. 17, the step S1520 includes the following steps:

S1710: The decoding device parses the bitstream to obtain the first identifier.

S1720: In a case that the first identifier indicates that the first string vector is not a preset string vector, the decoding device executes S1730, otherwise, the process ends.

S1730: The decoding device determines whether the first string vector is in a first displacement vector prediction list, if yes, S1740 is executed, otherwise, S1750 is executed.

S1740: The decoding device parses the bitstream to obtain an index of the first string vector in the first displacement vector prediction list and obtains the first string vector through the index.

S1750: The decoding device determines a preset condition satisfied by the attribute information, and parses the bitstream according to a decoding manner corresponding to the preset condition.

A difference between Embodiment 7 and Embodiment 6 is that Embodiment 7 does not need to determine whether to parse the bitstream according to the attribute information to obtain the first identifier, and the other parts are the same. Thus, Embodiment 7 may refer to the explanations in Embodiment 6, which is not repeated in this disclosure.

Embodiment 8

Figure 18:
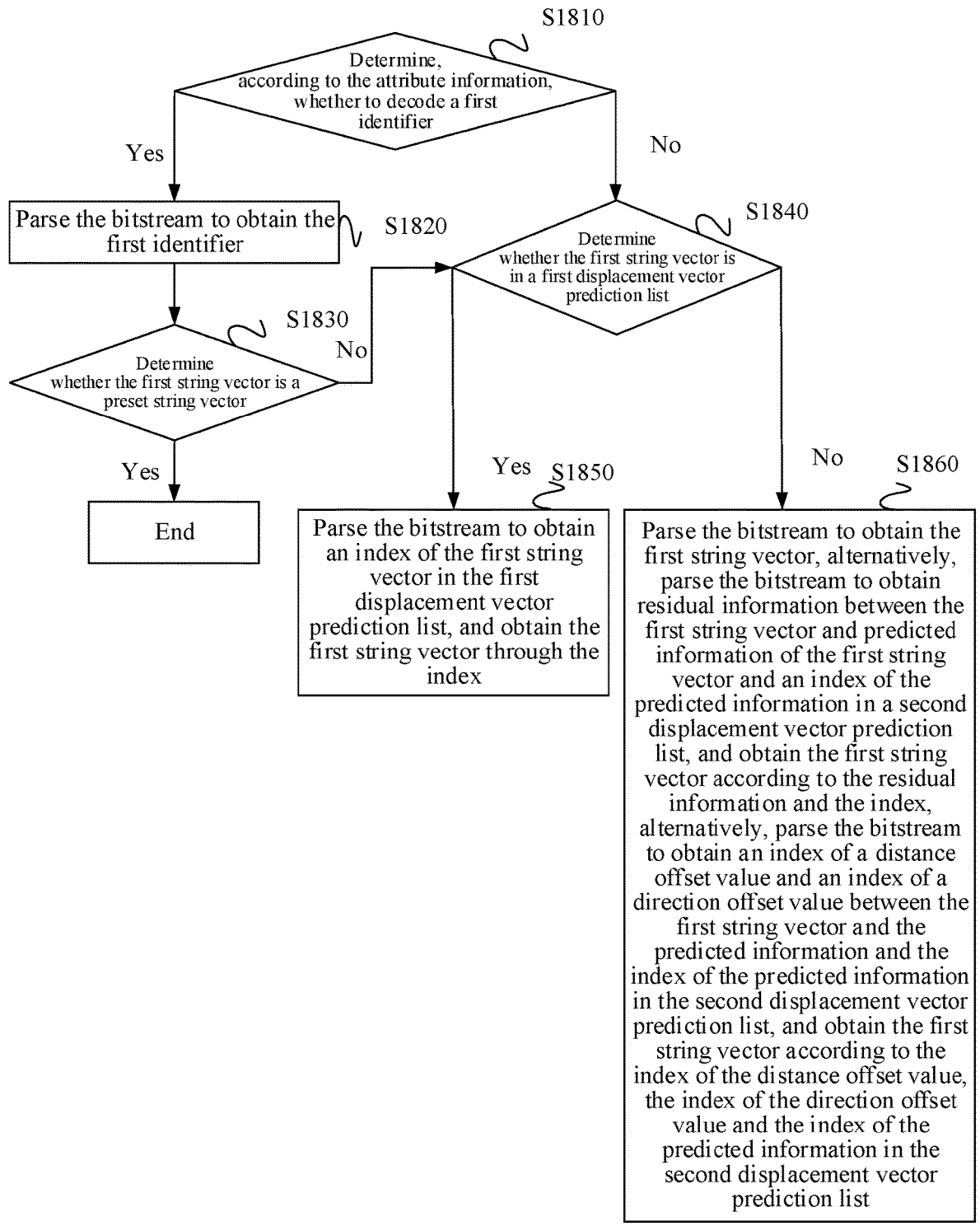
FIG. 18 is a flowchart of yet another method for decoding a string vector according to an embodiment of this disclosure.

FIG. 18 is a flowchart of yet another method for decoding a string vector according to an embodiment of this disclosure. As shown in FIG. 18, the step S1520 includes the following steps:

S1810: The decoding device determines, according to the attribute information, whether to decode the first identifier, if yes, S1820 is executed, otherwise S1840 is executed.

S1820: The decoding device parses the bitstream to obtain the first identifier.

S1830: In a case that the first identifier indicates that the first string vector is not a preset string vector, the decoding device executes S1840, otherwise, the process ends.

S1840: The decoding device determines whether the first string vector is in a first displacement vector prediction list, if yes, S1850 is executed, otherwise, S1860 is executed.

S1850: The decoding device parses the bitstream to obtain an index of the first string vector in the first displacement vector prediction list and obtains the first string vector through the index.

S1860: The decoding device parses the bitstream to obtain the first string vector, alternatively, parses the bitstream to obtain residual information between the first string vector and predicted information of the first string vector and an index of the predicted information in a second displacement vector prediction list, and obtains the first string vector according to the residual information and the index, alternatively, parses the bitstream to obtain an index of a distance offset value and an index of a direction offset value between the first string vector and the predicted information and the index of the predicted information in the second displacement vector prediction list, and obtains the first string vector according to the index of the distance offset value, the index of the direction offset value and the index of the predicted information in the second displacement vector prediction list.

A difference between Embodiment 8 and Embodiment 6 is that Embodiment 8 does not need to determine the preset condition satisfied by the attribute information, and decode the first string vector or the relevant information of the first string vector according to a decoding manner corresponding to the preset condition. Instead, Embodiment 8 directly parses the bitstream to obtain the first string vector, alternatively, parses the bitstream to obtain the residual information between the first string vector and the predicted information of the first string vector and the index of the predicted information in the second displacement vector prediction list, and obtains the first string vector according to the residual information and the index, alternatively, parses the bitstream to obtain the index of the distance offset value and the index of the direction offset value between the first string vector and the predicted information and the index of the predicted information in the second displacement vector prediction list, and obtains the first string vector according to the index of the distance offset value, the index of the direction offset value and the index of the predicted information in the second displacement vector prediction list. The other parts are the same. Thus, Embodiment 8 may refer to the explanations in Embodiment 6, which is not repeated in this disclosure.

The methods for decoding the string vector according to the embodiments of this disclosure are not limited to Embodiments 5 to 8. In fact, this disclosure describes a separate method for decoding a string vector, as long as the decoding method is combined with the attribute information of the to-be-decoded string. This disclosure further describes a combination of at least two decoding methods, such as a combination of at least two methods below: using the method for decoding the first identifier to decode the index of the first string vector in the first displacement vector prediction list, and using a direct decoding method to decode the index of the predicted information in the second displacement vector prediction list and the residual information, and decode the index of the predicted information in the second displacement vector prediction list, the index of the distance offset value and the index of the direction offset value. It is sufficient as long as at least one decoding method is performed in combination with the attribute information of the to-be-decoded string, for example: determining, according to the attribute information, whether to decode the first identifier; decoding the first identifier in a case that it is determined to decode the first identifier; and in a case that it is determined not to decode the first identifier or it is determined that the first string vector is not the preset string vector, any of the decoding methods of the string vector may be used, such as direct decoding of the first string vector. The direct decoding method may be a direct decoding method, or a direct decoding method according to an embodiment of this disclosure, which is not limited in this disclosure.

Embodiment 9

Figure 19:
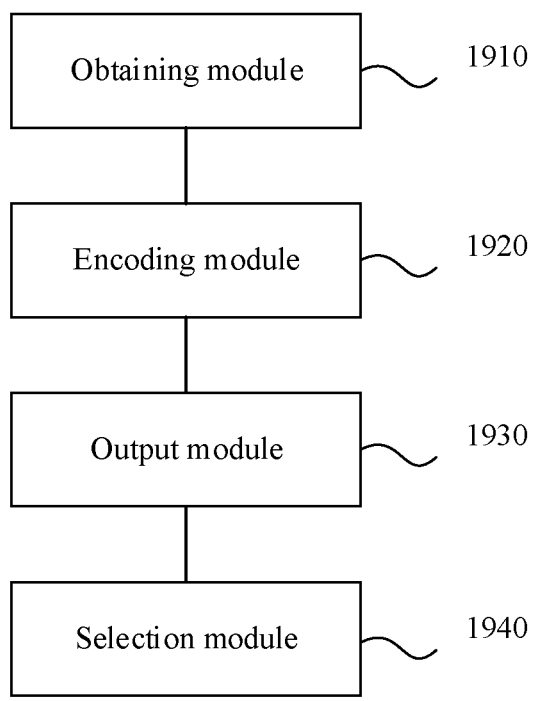
FIG. 19 is a schematic diagram of an encoding device according to an embodiment of this disclosure.

FIG. 19 is a schematic diagram of an encoding device according to an embodiment of this disclosure. As shown in FIG. 19, the device includes:

an obtaining module 1910, configured to obtain attribute information of a to-be-encoded string, the attribute information including at least one of position information and a length of the to-be-encoded string;

an encoding module 1920, configured to encode a first string vector or relevant information of the first string vector according to the attribute information to obtain a bitstream, the first string vector being a string vector of the to-be-encoded string; and an output module 1930, configured to output the bitstream.

In some embodiments, the encoding module 1920 is configured to: determine, according to the attribute information, whether to encode a first identifier, the first identifier being used to indicate whether the first string vector is a preset string vector.

In some embodiments, the encoding module 1920 is further configured to: encode the first identifier in a case that it is determined to encode the first identifier; determine whether the first string vector is in a first displacement vector prediction list, in a case that it is determined not to encode the first identifier or it is determined that the first string vector is not the preset string vector; obtain an index of the first string vector in the first displacement vector prediction list and encode the index of the first string vector in the first displacement vector prediction list, in a case that it is determined that the first string vector is in the first displacement vector prediction list; and determine a preset condition satisfied by the attribute information, and encode the first string vector or the relevant information of the first string vector according to an encoding manner corresponding to the preset condition, in a case that it is determined that the first string vector is not in the first displacement vector prediction list.

In some embodiments, the encoding module 1920 is further configured to: encode the first identifier in a case that it is determined to encode the first identifier; determine whether the first string vector is in a first displacement vector prediction list, in a case that it is determined not to encode the first identifier or it is determined that the first string vector is not the preset string vector; obtain an index of the first string vector in the first displacement vector prediction list and encode the index of the first string vector in the first displacement vector prediction list, in a case that it is determined that the first string vector is in the first displacement vector prediction list; and encode the first string vector, alternatively, obtain residual information between the first string vector and predicted information of the first string vector and encode an index of the predicted information in a second displacement vector prediction list and the residual information, alternatively, obtain an index of a distance offset value and an index of a direction offset value between the first string vector and the predicted information and encode the index of the predicted information in the second displacement vector prediction list, the index of the distance offset value and the index of the direction offset value, in a case that it is determined that the first string vector is not in the first displacement vector prediction list.

In some embodiments, the encoding module 1920 is further configured to: encode the first identifier in a case that it is determined to encode the first identifier; and encode the first string vector in a case that it is determined not to encode the first identifier or it is determined that the first string vector is not the preset string vector.

In some embodiments, the encoding module 1920 is configured to: determine a preset condition satisfied by the attribute information; and encode the first string vector or the relevant information of the first string vector according to an encoding manner corresponding to the preset condition.

In some embodiments, the encoding module 1920 is further configured to: encode a first identifier, the first identifier being used to indicate whether the first string vector is a preset string vector; and determine whether the first string vector is in a first displacement vector prediction list, in a case that it is determined that the first string vector is not the preset string vector. Accordingly, the encoding module 1920 is configured to: determine a preset condition satisfied by the attribute information, in a case that it is determined that the first string vector is not in the first displacement vector prediction list.

In some embodiments, the encoding module 1920 is further configured to: obtain an index of the first string vector in the first displacement vector prediction list and encode the index of the first string vector in the first displacement vector prediction list, in a case that it is determined that the first string vector is in the first displacement vector prediction list.

In some embodiments, the encoding module 1920 is configured to: determine not to encode the first identifier in a case that a difference between a longitudinal coordinate of an end point and a longitudinal coordinate of a start point of the to-be-encoded string is greater than a first threshold, and determine to encode the first identifier in a case that the difference between the longitudinal coordinate of the end point and the longitudinal coordinate of the start point of the to-be-encoded string is less than or equal to the first threshold; alternatively, determine not to encode the first identifier in a case that a length of the to-be-encoded string is greater than a second threshold, and determine to encode the first identifier in a case that the length of the to-be-encoded string is less than or equal to the second threshold; alternatively, determine not to encode the first identifier in a case that the difference between the longitudinal coordinate of the end point and the longitudinal coordinate of the start point of the to-be-encoded string is greater than the first threshold and the length of the to-be-encoded string is greater than the second threshold, otherwise, determine to encode the first identifier.

In some embodiments, the device further includes a selection module 1940, configured to select a context model according to the attribute information, the context model being configured to encode the to-be-encoded string.

In some embodiments, the selection module 1940 is configured to: select a first context model in a case that the difference between the longitudinal coordinate of the end point and the longitudinal coordinate of the start point of the to-be-encoded string is greater than the first threshold, and select a second context model in a case that the difference between the longitudinal coordinate of the end point and the longitudinal coordinate of the start point of the to-be-encoded string is less than or equal to the first threshold; alternatively, select the first context model in a case that the length of the to-be-encoded string is greater than the second threshold, and select the second context model in a case that the length of the to-be-encoded string is less than or equal to the second threshold; alternatively, select the first context model in a case that the difference between the longitudinal coordinate of the end point and the longitudinal coordinate of the start point of the to-be-encoded string is greater than the first threshold, and the length of the to-be-encoded string is greater than the second threshold, otherwise, select the second context model.

In some embodiments, in a case that a scanning direction in a prediction mode of the to-be-encoded string is a horizontal scanning direction, the preset string vector is a string vector between an upper reference string of the to-be-encoded string and the to-be-encoded string, that is, the preset string vector is a string vector in which the upper reference string of the to-be-encoded string points to the to-be-encoded string. In a case that the scanning direction in the prediction mode of the to-be-encoded string is a vertical scanning direction, the preset string vector is a string vector between a left reference string of the to-be-encoded string and the to-be-encoded string, that is, the preset string vector is a string vector in which the left reference string of the to-be-encoded string points to the to-be-encoded string.

In some embodiments, the encoding module 1920 is configured to: encode the first string vector in a case that the preset condition is that the difference between the longitudinal coordinate of the end point and the longitudinal coordinate of the start point of the to-be-encoded string is less than or equal to a third threshold; alternatively, encode the first string vector in a case that the preset condition is that the length of the to-be-encoded string is less than or equal to a fourth threshold.

In some embodiments, the encoding module 1920 is configured to: add a first offset value to a horizontal coordinate of the first string vector to perform encoding in a case that a longitudinal coordinate of the first string vector is greater than 0; alternatively, add a second offset value to a longitudinal coordinate of the first string vector to perform encoding in a case that a horizontal coordinate of the first string vector is greater than 0.

In some embodiments, in a case that the encoding is performed in a horizontal reciprocating scanning manner and the start point of the to-be-encoded string is in an even-numbered row, the first offset value is a minimum value between a first value and a width of an encoding unit in which the to-be-encoded string is located, the first value being a sum of a horizontal coordinate of the start point and the length of the to-be-encoded string. Alternatively, in a case that the encoding is performed in the horizontal reciprocating scanning manner and the start point of the to-be-encoded string is in an odd-numbered row, the first offset value is a sum of the horizontal coordinate of the start point and 1. Alternatively, in a case that the encoding is performed in the horizontal reciprocating scanning manner and the longitudinal coordinate of the end point of the to-be-encoded string is greater than a second value, the first offset value is the width of the encoding unit in which the to-be-encoded string is located, the second value being a sum of the longitudinal coordinate of the start point of the to-be-encoded string and 1. Alternatively, in a case that the encoding is performed in the horizontal reciprocating scanning manner, the start point of the to-be-encoded string is in an odd-numbered row, the longitudinal coordinate of the end point of the to-be-encoded string is equal to the second value, and a horizontal coordinate of the end point is greater than the horizontal coordinate of the start point, the first offset value is a sum of the horizontal coordinate of the end point and 1.

In some embodiments, in a case that the encoding is performed in the horizontal reciprocating scanning manner, the end point of the to-be-encoded string is in an even-numbered row, and a sum of the horizontal coordinate of the end point and the horizontal coordinate of the first string vector is greater than or equal to the width of the encoding unit in which the to-be-encoded string is located, the second offset value is equal to a sum of the longitudinal coordinate of the end point and 1. Alternatively, in a case that the encoding is performed in the horizontal reciprocating scanning manner, the end point of the to-be-encoded string is in an even-numbered row, and a sum of the horizontal coordinate of the end point and the horizontal coordinate of the first string vector is less than the width of the encoding unit in which the to-be-encoded string is located, the second offset value is equal to 0. Alternatively, in a case that the encoding is performed in the horizontal reciprocating scanning manner and a third value is greater than or equal to the width of the encoding unit in which the to-be-encoded string is located, the second offset value is equal to a sum of the longitudinal coordinate of the end point and 1. The third value is the horizontal coordinate of the end point plus the length of the to-be-encoded string and the horizontal coordinate of the first string vector, and then minus 1.

In some embodiments, the encoding module 1920 is configured to: obtain the residual information between the first string vector and the predicted information of the first string vector, and encode the index of the predicted information and the residual information, in a case that the preset condition is that the difference between the longitudinal coordinate of the end point and the longitudinal coordinate of the start point of the to-be-encoded string is greater than the third threshold; alternatively, obtain the residual information between the first string vector and the predicted information of the first string vector, and encode the index of the predicted information and the residual information, in a case that the preset condition is that the length of the to-be-encoded string is greater than the fourth threshold; alternatively, obtain the residual information between the first string vector and the predicted information of the first string vector, and encode the index of the predicted information and the residual information, in a case that the preset condition is that the difference between the longitudinal coordinate of the end point and the longitudinal coordinate of the start point of the to-be-encoded string is greater than the third threshold, and the length of the to-be-encoded string is greater than the fourth threshold.

In some embodiments, the encoding module 1920 is configured to: obtain the index of the distance offset value and the index of the direction offset value between the first string vector and the predicted information, and encode the index of the predicted information in the second displacement vector prediction list, the index of the distance offset value and the index of the direction offset value, in a case that the preset condition is that the difference between the longitudinal coordinate of the end point and the longitudinal coordinate of the start point of the to-be-encoded string is greater than the third threshold; alternatively, obtain the index of the distance offset value and the index of the direction offset value between the first string vector and the predicted information, and encode the index of the predicted information in the second displacement vector prediction list, the index of the distance offset value and the index of the direction offset value, in a case that the preset condition is that the length of the to-be-encoded string is greater than the fourth threshold; alternatively, obtain the index of the distance offset value and the index of the direction offset value between the first string vector and the predicted information, and encode the index of the predicted information in the second displacement vector prediction list, the index of the distance offset value and the index of the direction offset value, in a case that the preset condition is that the difference between the longitudinal coordinate of the end point and the longitudinal coordinate of the start point of the to-be-encoded string is greater than the third threshold, and the length of the to-be-encoded string is greater than the fourth threshold.

The device embodiments and the method embodiments may correspond to each other, and similar descriptions may refer to the method embodiments. To avoid repetition, details are not repeated here. For example, the encoding device shown in FIG. 19 may execute the method embodiments corresponding to the above encoding device, and the foregoing and other operations and/or functions of each module in the encoding device are respectively used to implement a corresponding flow of the method embodiment corresponding to the above encoding device. For brevity, details are not repeated here.

Embodiment 10

Figure 20:
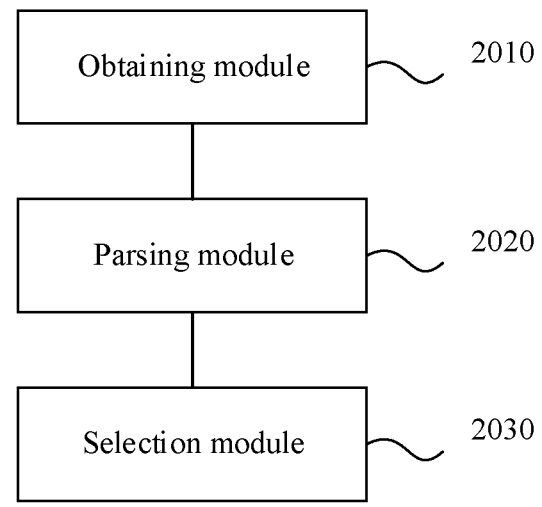
FIG. 20 is a schematic diagram of a decoding device according to an embodiment of this disclosure.

FIG. 20 is a schematic diagram of a decoding device according to an embodiment of this disclosure. As shown in FIG. 20, the device includes:

an obtaining module 2010, configured to obtain a bitstream and attribute information of a to-be-decoded string, the attribute information including at least one of position information and a length of the to-be-decoded string; and a parsing module 2020, configured to parse the bitstream according to the attribute information to obtain a first string vector, the first string vector being a string vector of the to-be-decoded string.

In some embodiments, the parsing module 2020 is configured to: determine, according to the attribute information, whether to decode a first identifier, the first identifier being used to indicate whether the first string vector is a preset string vector.

In some embodiments, the parsing module 2020 is further configured to: decode the first identifier in a case that it is determined to decode the first identifier; parse the bitstream to determine whether the first string vector is in a first displacement vector prediction list, in a case that it is determined not to decode the first identifier or it is determined that the first string vector is not the preset string vector; parse the bitstream to obtain an index of the first string vector in the first displacement vector prediction list and obtain the first string vector through the index, in a case that it is determined that the first string vector is in the first displacement vector prediction list; and determine a preset condition satisfied by the attribute information, and parse the bitstream according to a decoding manner corresponding to the preset condition, in a case that it is determined that the first string vector is not in the first displacement vector prediction list.

In some embodiments, the parsing module 2020 is further configured to: decode the first identifier in a case that it is determined to decode the first identifier; parse the bitstream to determine whether the first string vector is in a first displacement vector prediction list, in a case that it is determined not to decode the first identifier or it is determined that the first string vector is not the preset string vector; parse the bitstream to obtain an index of the first string vector in the first displacement vector prediction list and obtain the first string vector through the index, in a case that it is determined that the first string vector is in the first displacement vector prediction list; and parse the bitstream to obtain the first string vector, alternatively, parse the bitstream to obtain residual information between the first string vector and predicted information of the first string vector and an index of the predicted information in a second displacement vector prediction list, and obtain the first string vector according to the residual information and the index, alternatively, parse the bitstream to obtain an index of a distance offset value and an index of a direction offset value between the first string vector and the predicted information and the index of the predicted information in the second displacement vector prediction list, and obtain the first string vector according to the index of the distance offset value, the index of the direction offset value and the index of the predicted information in the second displacement vector prediction list, in a case that it is determined that the first string vector is not in the first displacement vector prediction list.

In some embodiments, the parsing module 2020 is further configured to: decode the first identifier in a case that it is determined to decode the first identifier; and parse the bitstream to obtain the first string vector in a case that it is determined not to decode the first identifier or it is determined that the first string vector is not the preset string vector.

In some embodiments, the parsing module 2020 is configured to: determine a preset condition satisfied by the attribute information; and parse the bitstream according to a decoding manner corresponding to the preset condition.

In some embodiments, the parsing module 2020 is further configured to: parse the bitstream to obtain a first identifier, the first identifier being used to indicate whether the first string vector is a preset string vector; and parse the bitstream to determine whether the first string vector is in a first displacement vector prediction list, in a case that it is determined that the first string vector is not the preset string vector. Accordingly, the parsing module 2020 is configured to: determine a preset condition satisfied by the attribute information, in a case that it is determined that the first string vector is not in the first displacement vector prediction list.

In some embodiments, the parsing module 2020 is further configured to: parse the bitstream to obtain an index of the first string vector in the first displacement vector prediction list and obtain the first string vector through the index, in a case that it is determined that the first string vector is in the first displacement vector prediction list.

In some embodiments, the parsing module 2020 is configured to: determine not to decode the first identifier in a case that a difference between a longitudinal coordinate of an end point and a longitudinal coordinate of a start point of the to-be-decoded string is greater than a first threshold, and determine to decode the first identifier in a case that the difference between the longitudinal coordinate of the end point and the longitudinal coordinate of the start point of the to-be-decoded string is less than or equal to the first threshold; alternatively, determine not to decode the first identifier in a case that a length of the to-be-decoded string is greater than a second threshold, and determine to decode the first identifier in a case that the length of the to-be-decoded string is less than or equal to the second threshold; alternatively, determine not to decode the first identifier in a case that the difference between the longitudinal coordinate of the end point and the longitudinal coordinate of the start point of the to-be-decoded string is greater than the first threshold and the length of the to-be-decoded string is greater than the second threshold, otherwise, determine to decode the first identifier.

In some embodiments, the device further includes a selection module 2030, configured to select a context model according to the attribute information, the context model being configured to decode the to-be-decoded string.

In some embodiments, the selection module 2030 is configured to: select a first context model in a case that the difference between the longitudinal coordinate of the end point and the longitudinal coordinate of the start point of the to-be-decoded string is greater than the first threshold, and select a second context model in a case that the difference between the longitudinal coordinate of the end point and the longitudinal coordinate of the start point of the to-be-decoded string is less than or equal to the first threshold; alternatively, select the first context model in a case that the length of the to-be-decoded string is greater than the second threshold, and select the second context model in a case that the length of the to-be-decoded string is less than or equal to the second threshold; alternatively, select the first context model in a case that the difference between the longitudinal coordinate of the end point and the longitudinal coordinate of the start point of the to-be-decoded string is greater than the first threshold, and the length of the to-be-decoded string is greater than the second threshold, otherwise, select the second context model.

In some embodiments, in a case that a scanning direction in a prediction mode of the to-be-decoded string is a horizontal scanning direction, the preset string vector is a string vector between an upper reference string of the to-be-decoded string and the to-be-decoded string. In a case that the scanning direction in the prediction mode of the to-be-decoded string is a vertical scanning direction, the preset string vector is a string vector between a left reference string of the to-be-decoded string and the to-be-decoded string.

In some embodiments, the parsing module 2020 is configured to: parse the bitstream to obtain the first string vector in a case that the preset condition is that the difference between the longitudinal coordinate of the end point and the longitudinal coordinate of the start point of the to-be-decoded string is less than or equal to a third threshold; alternatively, parse the bitstream to obtain the first string vector in a case that the preset condition is that the length of the to-be-decoded string is less than or equal to a fourth threshold.

In some embodiments, the parsing module 2020 is configured to: parse the bitstream to obtain parsed longitudinal and horizontal coordinates of the first string vector; subtract a first offset value from the parsed horizontal coordinate to obtain a horizontal coordinate of the first string vector in a case that the parsed longitudinal coordinate is greater than 0; alternatively, subtract a second offset value from the parsed longitudinal coordinate to obtain a longitudinal coordinate of the first string vector in a case that the parsed horizontal coordinate is greater than 0.

In some embodiments, in a case that the decoding is performed in a horizontal reciprocating scanning manner and the start point of the to-be-decoded string is in an even-numbered row, the first offset value is a minimum value between a first value and a width of a decoding unit in which the to-be-decoded string is located, the first value being a sum of a horizontal coordinate of the start point and the length of the to-be-decoded string. Alternatively, in a case that the decoding is performed in the horizontal reciprocating scanning manner and the start point of the to-be-decoded string is in an odd-numbered row, the first offset value is a sum of the horizontal coordinate of the start point and 1. Alternatively, in a case that the decoding is performed in the horizontal reciprocating scanning manner and the longitudinal coordinate of the end point of the to-be-decoded string is greater than a second value, the first offset value is the width of the encoding unit in which the to-be-decoded string is located, the second value being a sum of the longitudinal coordinate of the start point of the to-be-decoded string and 1. Alternatively, in a case that the decoding is performed in the horizontal reciprocating scanning manner, the start point of the to-be-decoded string is in an odd-numbered row, the longitudinal coordinate of the end point of the to-be-decoded string is equal to the second value, and a horizontal coordinate of the end point is greater than the horizontal coordinate of the start point, the first offset value is a sum of the horizontal coordinate of the end point and 1.

In some embodiments, in a case that the decoding is performed in the horizontal reciprocating scanning manner, the end point of the to-be-decoded string is in an even-numbered row, and a sum of the horizontal coordinate of the end point and the horizontal coordinate of the first string vector is greater than or equal to the width of the decoding unit in which the to-be-decoded string is located, the second offset value is equal to a sum of the longitudinal coordinate of the end point and 1. Alternatively, in a case that the decoding is performed in the horizontal reciprocating scanning manner, the end point of the to-be-decoded string is in an even-numbered row, and a sum of the horizontal coordinate of the end point and the horizontal coordinate of the first string vector is less than the width of the decoding unit in which the to-be-decoded string is located, the second offset value is equal to 0. Alternatively, in a case that the decoding is performed in the horizontal reciprocating scanning manner and a third value is greater than or equal to the width of the decoding unit in which the to-be-decoded string is located, the second offset value is equal to a sum of the longitudinal coordinate of the end point and 1. The third value is the horizontal coordinate of the end point plus the length of the to-be-decoded string and the horizontal coordinate of the first string vector, and then minus 1.

In some embodiments, the parsing module 2020 is configured to: parse the bitstream to obtain the residual information between the first string vector and the predicted information of the first string vector and the index of the predicted information in the second displacement vector prediction list, and obtain the first string vector according to the residual information and the index, in a case that the preset condition is that the difference between the longitudinal coordinate of the end point and the longitudinal coordinate of the start point of the to-be-decoded string is greater than the third threshold; alternatively, parse the bitstream to obtain the residual information between the first string vector and the predicted information of the first string vector and the index of the predicted information in the second displacement vector prediction list, and obtain the first string vector according to the residual information and the index, in a case that the preset condition is that the length of the to-be-decoded string is greater than the fourth threshold; alternatively, parse the bitstream to obtain the residual information between the first string vector and the predicted information of the first string vector and the index of the predicted information in the second displacement vector prediction list, and obtain the first string vector according to the residual information and the index, in a case that the preset condition is that the difference between the longitudinal coordinate of the end point and the longitudinal coordinate of the start point of the to-be-decoded string is greater than the third threshold, and the length of the to-be-decoded string is greater than the fourth threshold.

In some embodiments, the parsing module 2020 is configured to: parse the bitstream to obtain the index of the distance offset value and the index of the direction offset value between the first string vector and the predicted information and the index of the predicted information in the second displacement vector prediction list, and obtain the first string vector according to the index of the distance offset value, the index of the direction offset value and the index of the predicted information in the second displacement vector prediction list, in a case that the preset condition is that the difference between the longitudinal coordinate of the end point and the longitudinal coordinate of the start point of the to-be-decoded string is greater than the third threshold; alternatively, parse the bitstream to obtain the index of the distance offset value and the index of the direction offset value between the first string vector and the predicted information and the index of the predicted information in the second displacement vector prediction list, and obtain the first string vector according to the index of the distance offset value, the index of the direction offset value and the index of the predicted information in the second displacement vector prediction list, in a case that the preset condition is that the length of the to-be-decoded string is greater than the fourth threshold; alternatively, parse the bitstream to obtain the index of the distance offset value and the index of the direction offset value between the first string vector and the predicted information and the index of the predicted information in the second displacement vector prediction list, and obtain the first string vector according to the index of the distance offset value, the index of the direction offset value and the index of the predicted information in the second displacement vector prediction list, in a case that the preset condition is that the difference between the longitudinal coordinate of the end point and the longitudinal coordinate of the start point of the to-be-decoded string is greater than the third threshold, and the length of the to-be-decoded string is greater than the fourth threshold.

The device embodiments and the method embodiments may correspond to each other, and similar descriptions may refer to the method embodiments. To avoid repetition, details are not repeated here. For example, the decoding device shown in FIG. 20 may execute the method embodiments corresponding to the above decoding device, and the foregoing and other operations and/or functions of each module in the decoding device are respectively used to implement a corresponding flow of the method embodiment corresponding to the above decoding device. For brevity, details are not repeated here.

This disclosure further provides an encoding device, which may be used to perform the method embodiment corresponding to the above encoding device. The device may be an encoder, or a device used to perform string vector encoding, such as a desktop computer, a mobile computing device, a notebook (for example, laptop) computer, a tablet computer, a set-top box, a handheld device such as a smartphone, a television, a camera, a display device, a digital media player, a video game console, an in-vehicle computer, or the like, and other string vector encoding devices. In a case of a device that performs string vector encoding, the device includes an encoder, a display, a memory, and the like, and the encoder is mainly used to execute the method embodiment corresponding to the encoding device.

This disclosure further provides a decoding device, which may be used to perform the method embodiment corresponding to the above decoding device. The device may be a decoder, or a device used to perform string vector decoding, such as a desktop computer, a mobile computing device, a notebook (for example, laptop) computer, a tablet computer, a set-top box, a handheld device such as a smartphone, a television, a camera, a display device, a digital media player, a video game console, an in-vehicle computer, or the like, and other string vector decoding devices. In a case of a device that performs string vector decoding, the device includes a decoder, a display, a memory, and the like, and the decoder is mainly used to execute the method embodiment corresponding to the decoding device.

In some embodiments of this disclosure, the memory includes, but is not limited to:

a volatile memory and/or a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM) and a direct rambus random access memory (DR RAM).

In some embodiments of this disclosure, the computer program may be divided into one or more modules, which are stored in the memory (including a non-transitory computer-readable storage medium) and executed by the processor (including processing circuitry) to complete the method according to the embodiments of this disclosure. The one or more modules may be a series of computer program instruction segments capable of completing a particular function, and the instruction segment is used to describe a process of execution of the computer program in an image processing device.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A method for encoding a string vector, the method comprising:
    obtaining attribute information of a pixel string in an image frame, the attribute information comprising at least one of position information of the pixel string within an encoding unit of the image frame or a length of the pixel string;
    encoding a first identifier indicating a first string vector, the first identifier indicating whether the first string vector is a preset string vector;
    when the first string vector is not the preset string vector, determining whether the first string vector is in a first displacement vector prediction list;
    when the first string vector is not in the first displacement vector prediction list, determining whether a preset condition is satisfied by the attribute information; and
    encoding information indicating the first string vector according to an encoding manner corresponding to the preset condition when the preset condition is satisfied.

2. The method according to claim 1, wherein the encoding the first identifier further comprises:
    determining, according to the attribute information, whether to encode the first identifier in the information indicating the first string vector; and
    in response to a determination to encode the first identifier, encoding the first identifier.

3. The method according to claim 2, wherein
    when the first identifier is not to be encoded, determining whether the first string vector is in the first displacement vector prediction list;
    when the first string vector is in the first displacement vector prediction list, obtaining an index of the first string vector in the first displacement vector prediction list and encoding the index of the first string vector in the first displacement vector prediction list;
    when the first string vector is not in the first displacement vector prediction list and the first identifier is not to be encoded,
        determining the preset condition is satisfied by the attribute information, and
        encoding the information indicating the first string vector according to the encoding manner corresponding to the preset condition.

4. The method according to claim 2, wherein
    when the first string vector is in the first displacement vector prediction list, obtaining an index of the first string vector in the first displacement vector prediction list and encoding the index of the first string vector in the first displacement vector prediction list; and when the first string vector is not in the first displacement vector prediction list, the encoding the information indicating the first string vector comprises:
(i) encoding the first string vector,
(ii) obtaining residual information between the first string vector and predicted information of the first string vector and encoding an index of the predicted information in a second displacement vector prediction list and the residual information, or
(iii) obtaining an index of a distance offset value and an index of a direction offset value between the first string vector and the predicted information and encoding the index of the predicted information in the second displacement vector prediction list, the index of the distance offset value, and the index of the direction offset value.

5. The method according to claim 2, further comprising:
when (i) the first identifier is not to be encoded or (ii) the first string vector is not the preset string vector, encoding the first string vector.

6. The method according to claim 1, further comprising:
when the first string vector is in the first displacement vector prediction list, obtaining an index of the first string vector in the first displacement vector prediction list and encoding the index of the first string vector in the first displacement vector prediction list.

7. The method according to claim 2, wherein the determining whether to encode further comprises:
determining not to encode the first identifier when a difference between a vertical coordinate of an end point and a vertical coordinate of a start point of the pixel string is greater than a first threshold, and determining to encode the first identifier when the difference between the vertical coordinate of the end point and the vertical coordinate of the start point of the pixel string is less than or equal to the first threshold;
determining not to encode the first identifier when the length of the pixel string is greater than a second threshold, and determining to encode the first identifier when the length of the pixel string is less than or equal to the second threshold; or
determining not to encode the first identifier when (i) the difference between the vertical coordinate of the end point and the vertical coordinate of the start point of the pixel string is greater than the first threshold, and (ii) the length of the pixel string is greater than the second threshold, otherwise determining to encode the first identifier.

8. The method according to claim 2, further comprising:
selecting a context model according to the attribute information, the context model being used to encode the pixel string.

9. The method according to claim 8, wherein the selecting the context model comprises:
selecting a first context model when a difference between a vertical coordinate of an end point and a vertical coordinate of a start point of the pixel string is greater than a first threshold, and selecting a second context model when the difference between the vertical coordinate of the end point and the vertical coordinate of the start point of the pixel string is less than or equal to the first threshold;
selecting the first context model when the length of the pixel string is greater than a second threshold, and selecting the second context model when the length of the pixel string is less than or equal to the second threshold; or
selecting the first context model when (i) the difference between the vertical coordinate of the end point and the vertical coordinate of the start point of the pixel string is greater than the first threshold, and (ii) the length of the pixel string is greater than the second threshold, otherwise selecting the second context model.

10. The method according to claim 2, wherein
when a scanning direction in a prediction mode of the pixel string is a horizontal scanning direction, the preset string vector is a string vector between an upper reference string of the pixel string and the pixel string; and
when the scanning direction in the prediction mode of the pixel string is a vertical scanning direction, the preset string vector is a string vector between a left reference string of the pixel string and the pixel string.

11. The method according to claim 3, wherein the method further comprises:
encoding the first string vector when the determined preset condition is that a difference between a vertical coordinate of an end point and a vertical coordinate of a start point of the pixel string is less than or equal to a third threshold; or
encoding the first string vector when the determined preset condition is that the length of the pixel string is less than or equal to a fourth threshold.

12. The method according to claim 11, wherein the encoding the first string vector comprises:
adding a first offset value to a horizontal coordinate of the first string vector to perform encoding when a vertical coordinate of the first string vector is greater than 0; or
adding a second offset value to the vertical coordinate of the first string vector to perform encoding when the horizontal coordinate of the first string vector is greater than 0.

13. The method according to claim 12, wherein
when the encoding is performed in a horizontal reciprocating scanning manner and the start point of the pixel string is in an even-numbered row, the first offset value is a minimum value between a first value and a width of the encoding unit in which the pixel string is located, the first value being a sum of a horizontal coordinate of the start point and the length of the pixel string;
when the encoding is performed in the horizontal reciprocating scanning manner and the start point of the pixel string is in an odd-numbered row, the first offset value is a sum of the horizontal coordinate of the start point and 1;
when the encoding is performed in the horizontal reciprocating scanning manner and the vertical coordinate of the end point of the pixel string is greater than a second value, the first offset value is the width of the encoding unit in which the pixel string is located, the second value being a sum of the vertical coordinate of the start point of the pixel string and 1; or
when the encoding is performed in the horizontal reciprocating scanning manner, the start point of the pixel string is in an odd-numbered row, the vertical coordinate of the end point of the pixel string is equal to the second value, and a horizontal coordinate of the end point is greater than the horizontal coordinate of the start point, the first offset value is a sum of the horizontal coordinate of the end point and 1.

14. The method according to claim 12, wherein
when the encoding is performed in a horizontal reciprocating scanning manner, the end point of the pixel string is in an even-numbered row, and a sum of a horizontal coordinate of the end point of the pixel string and the horizontal coordinate of the first string vector is greater than or equal to a width of the encoding unit in which the pixel string is located, the second offset value is equal to a sum of the vertical coordinate of the end point and 1;
when the encoding is performed in the horizontal reciprocating scanning manner, the end point of the pixel string is in an even-numbered row, and a sum of the horizontal coordinate of the end point and the horizontal coordinate of the first string vector is less than the width of the encoding unit in which the pixel string is located, the second offset value is equal to 0; or
when the encoding is performed in the horizontal reciprocating scanning manner and a third value is greater than or equal to the width of the encoding unit in which the pixel string is located, the second offset value is equal to a sum of the vertical coordinate of the end point and 1, the third value being a sum of (the horizontal coordinate of the end point plus the length of the pixel string and the horizontal coordinate of the first string vector) minus 1.

15. The method according to claim 3, wherein the encoding the information indicating the first string vector comprises:
obtaining residual information between the first string vector and predicted information of the first string vector, and encoding an index of the predicted information and the residual information, when the determined preset condition is that a difference between a vertical coordinate of an end point and a vertical coordinate of a start point of the pixel string is greater than a third threshold;
obtaining the residual information between the first string vector and the predicted information of the first string vector, and encoding the index of the predicted information and the residual information, when the determined preset condition is that the length of the pixel string is greater than a fourth threshold; or
obtaining the residual information between the first string vector and the predicted information of the first string vector, and encoding the index of the predicted information and the residual information, when the determined preset condition is that (i) the difference between the vertical coordinate of the end point and the vertical coordinate of the start point of the pixel string is greater than the third threshold, and (ii) the length of the pixel string is greater than the fourth threshold.

16. The method according to claim 3, wherein the encoding the information indicating the first string vector comprises:
obtaining an index of a distance offset value and an index of a direction offset value between the first string vector and predicted information of the first string vector, and encoding an index of the predicted information in a second displacement vector prediction list, an index of the distance offset value, and an index of the direction offset value, when the determined preset condition is that a difference between a vertical coordinate of an end point of the pixel string and a vertical coordinate of a start point of the pixel string is greater than a third threshold;
obtaining the index of the distance offset value and the index of the direction offset value between the first string vector and the predicted information, and encoding the index of the predicted information in the second displacement vector prediction list, the index of the distance offset value, and the index of the direction offset value, when the determined preset condition is that the length of the pixel string is greater than a fourth threshold; or
obtaining the index of the distance offset value and the index of the direction offset value between the first string vector and the predicted information, and encoding the index of the predicted information in the second displacement vector prediction list, the index of the distance offset value, and the index of the direction offset value, when the determined preset condition is that (i) the difference between the vertical coordinate of the end point and the vertical coordinate of the start point of the pixel string is greater than the third threshold, and (ii) the length of the pixel string is greater than the fourth threshold.

17. A method for decoding a string vector, the method comprising:
obtaining a bitstream and attribute information of a pixel string in an image frame, the attribute information comprising at least one of position information of the pixel string within an encoding unit of an image frame or a length of the pixel string;
obtaining a first identifier indicating a first string vector, the first identifier indicating whether the first string vector is a preset string vector;
when the first string vector is not the preset string vector, determining whether the first string vector is in a first displacement vector prediction list;
when the first string vector is not in the first displacement vector prediction list, determining whether a preset condition is satisfied by the attribute information; and
processing information indicating the first string vector according to a decoding manner corresponding to the preset condition when the preset condition is satisfied.

18. A method of processing visual media data, the method comprising:
processing a bitstream that includes the visual media data according to a format rule, wherein
the bitstream includes attribute information of a pixel string in an image frame, obtain attribute information of a pixel string in an image frame, the attribute information comprising at least one of position information of the pixel string within an encoding unit of the image frame or a length of the pixel string; and
the format rule specifies that:
a first identifier indicates whether a first string vector is a preset string vector;
when the first string vector is not the preset string vector, whether the first string vector is in a first displacement vector prediction list is determined;
when the first string vector is not in the first displacement vector prediction list, whether a preset condition satisfied by the attribute information is determined; and
information indicating the first string vector is reconstructed according to an encoding manner corresponding to the preset condition when the preset condition is satisfied.

* * * * *